(12) United States Patent
Kosonen et al.

(10) Patent No.: US 9,574,075 B2
(45) Date of Patent: Feb. 21, 2017

(54) METHOD AND A SYSTEM FOR MANUFACTURING A COMPOSITE PRODUCT AND A COMPOSITE PRODUCT

(75) Inventors: Harri Kosonen, Lappeenranta (FI); Kari Luukko, Espoo (FI); Sami Turunen, Lappeenranta (FI); Jere Salminen, Lappeenranta (FI); Stefan Fors, Kausala (FI); Petri Myllytie, Vaaksy (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/421,177

(22) PCT Filed: Aug. 28, 2012

(86) PCT No.: PCT/FI2012/050822
§ 371 (c)(1),
(2), (4) Date: May 19, 2015

(87) PCT Pub. No.: WO2014/033352
PCT Pub. Date: Mar. 6, 2014

(65) Prior Publication Data
US 2015/0240062 A1    Aug. 27, 2015

(51) Int. Cl.
*C08L 23/12*     (2006.01)
*B29B 7/92*      (2006.01)
(Continued)

(52) U.S. Cl.
CPC ............... *C08L 23/12* (2013.01); *B29B 7/905* (2013.01); *B29B 7/92* (2013.01); *B29B 9/06* (2013.01);
(Continued)

(58) Field of Classification Search
CPC ............ C08L 23/12; B29B 7/905; B29B 7/92; B29B 9/06; B29B 9/065; B29B 9/14; B29B 13/00; B29C 47/6056; B29K 2493/00
See application file for complete search history.

(56) References Cited

U.S. PATENT DOCUMENTS 5,574,094 A    11/1996 Malucelli et al.
5,746,958 A     5/1998 Gustafsson et al.
(Continued)

FOREIGN PATENT DOCUMENTS

GB     896117 A     5/1962
JP  2000328417 A   11/2000
(Continued)

OTHER PUBLICATIONS

Balasuriya, P. W., L. Ye, and Y-W. Mai. "Mechanical properties of wood flake-polyethylene composites. Part I: effects of processing methods and matrix melt flow behaviour." Composites Part A: Applied Science and Manufacturing 32.5 (2001): 619-629.*
(Continued)

*Primary Examiner* — Liam J Heincer
*Assistant Examiner* — Nicholas Hill
(74) *Attorney, Agent, or Firm* — Cantor Colburn LLP

(57) ABSTRACT

The invention relates to a method for manufacturing a composite product comprising organic natural fiber material and matrix material, wherein the method comprises mixing the organic natural fiber material with the matrix material in a primary mixing stage to form a mixture. The primary mixing stage comprises a contacting step in which the organic natural fiber material comes in contact with the matrix material that is at least partly in a form of melt, and bulk density of the organic natural fiber material is less than 500 kg/m$^3$. The method further comprises forming a composite product comprising the mixture. Further, the invention relates to a composite product, a use of the composite (Continued)

product, and a system for manufacturing a composite product.

11 Claims, 6 Drawing Sheets

(51) Int. Cl.
  *B29B 9/14*  (2006.01)
  *B29B 7/90*  (2006.01)
  *B29B 9/06*  (2006.01)
  *B29C 47/60*  (2006.01)
  *B29B 13/00*  (2006.01)
  *C08L 23/06*  (2006.01)
  *B29B 7/40*  (2006.01)
  *B29B 7/44*  (2006.01)
  *B29B 9/16*  (2006.01)

(52) U.S. Cl.
  CPC .............. *B29B 9/065* (2013.01); *B29B 9/14* (2013.01); *B29B 13/00* (2013.01); *B29C 47/6056* (2013.01); *C08L 23/06* (2013.01); *B29B 7/40* (2013.01); *B29B 7/44* (2013.01); *B29B 9/16* (2013.01); *B29K 2493/00* (2013.01)

(56) References Cited

U.S. PATENT DOCUMENTS

| | | | |
|---|---|---|---|
| 6,280,667 | B1 | 8/2001 | Koenig et al. |
| 2002/0000683 | A1 | 1/2002 | Sears et al. |
| 2003/0152793 | A1 | 8/2003 | Willemse |
| 2003/0228454 | A1 | 12/2003 | Barlow et al. |
| 2005/0087904 | A1 | 4/2005 | Bryan |
| 2009/0065975 | A1 | 3/2009 | Sain et al. |
| 2009/0110654 | A1 | 4/2009 | Hagemann et al. |
| 2009/0314442 | A1 | 12/2009 | Sain et al. |
| 2011/0144241 | A1 | 6/2011 | Yoshino et al. |
| 2011/0206931 | A1 | 8/2011 | Conley et al. |
| 2015/0284540 | A1* | 10/2015 | Kosonen .................. B29B 7/92 524/13 |

FOREIGN PATENT DOCUMENTS

| | | | |
|---|---|---|---|
| JP | 2003165108 | A | 6/2003 |
| JP | 254713 | | 9/2005 |
| JP | 2009263675 | A | 11/2009 |
| JP | 2011152787 | | 8/2011 |
| WO | 9501042 | | 4/1995 |
| WO | 2013072547 | A1 | 5/2013 |
| WO | 2014033352 | A1 | 3/2014 |
| WO | 2014033353 | A1 | 3/2014 |

OTHER PUBLICATIONS

Balasuriya, P. W., et al. "Mechanical properties of wood flake-polyethylene composites. II. Interface modification." Journal of applied polymer science 83.12 (2002): 2505-2521.*

Wood Flakes, Product APplication Bulletin, Eastern Instruments CentriFlow, http://easterninstruments.com/assets/PAB-Wood%20Flakes.pdf, downloaded on Jul. 8, 2016.*

Li, et al., "Study on Properties of Polyolefin/Natural Fiber Composites", Hubei Agricultural Sciences, Aug. 2011; vol. 50, No. 16, pp. 3375-3377.

International Search Report dated Jul. 2, 2013; International Application No. PCT/FI2012/050822; International Filing Date Aug. 28, 2012.

International Search Report dated Aug. 7, 2013; International Application No. PCT/FI2012/050823; International Filing Date Aug. 28, 2012.

Written Opinion dated Jul. 2, 2013; International Application No. PCT/FI2012/050822; International Filing Date Aug. 28, 2012.

Written Opinion dated Aug. 7, 2013; International Application No. PCT/FI2012/050823; International Filing Date Aug. 28, 2012.

* cited by examiner

METHOD AND A SYSTEM FOR MANUFACTURING A COMPOSITE PRODUCT AND A COMPOSITE PRODUCT

FIELD OF THE INVENTION

The invention relates to a method and a system for manufacturing a composite product. Further, the invention relates to a composite product and a use of the composite product.

BACKGROUND OF THE INVENTION

Known from prior art are different wood-polymer composites which are formed from wood-based material and polymers typically by extrusion.

SUMMARY OF THE INVENTION

It is an object of the invention to provide a new composite product. The composite product may be a final product or an intermediate product. Another object of the invention is to disclose a new method and a system for manufacturing a composite product. Another object of the invention is to disclose a novel use of the composite product.

Advantageously, the method for manufacturing a composite product comprising organic natural fiber material and matrix material comprises the following steps:

mixing the organic natural fiber material with the matrix material in a primary mixing stage to form a mixture, the primary mixing stage comprising a contacting step, in which
the organic natural fiber material comes in contact with the matrix material that is at least partly in a form of melt, and
bulk density of the organic natural fiber material is less than 500 kg/m³,
and
forming the composite product comprising the mixture.

Advantageously, the organic natural fiber material is crushed before the contacting step to form bulky organic natural fiber material.

Advantageously, the bulk density of the organic natural fiber material is less than 160 kg/m³.

Advantageously, the organic natural fiber material is mixed without a heavy compression with the matrix material in the contacting step of the primary mixing stage, i.e. the pressure compressing the organic natural fiber material in the contacting step is less than 2 bars, more preferably less than 1 bar.

Advantageously, the materials are mixed in a vacuum or in a presence of nitrogen, air and/or helium.

Advantageously, moisture content of the organic natural fiber material is below 7%, preferably below 5% in the contacting step of the mixing.

Advantageously, at least one mixer that is capable of heating the mixture is used in the primary mixing stage.

Advantageously, the content of the organic natural fiber material is at least 10 dry wt. %, more preferably between 20 and 80 dry wt. % calculated from the total dry weight of the composite product.

Advantageously, the lignin content of the organic natural fiber material is under 15 wt. %.

Advantageously, the amount of flake-form fiber material is at least 30 dry wt. % calculated from the total amount of the organic natural fiber material.

Advantageously, melting point of the matrix material is under 250° C. and/or glass transition temperature of the matrix material is under 250° C.

Advantageously, the composite product is formed by injection moulding, and/or extrusion.

Advantageously, the matrix material is thermoplastic.

Advantageously, at least 90 wt. % of the organic natural fiber material is wood material.

Advantageously, the length of at least 90 wt. % of the organic natural fiber material is between 0.1 mm and 3 mm.

Advantageously, the composite product according to the present invention comprises organic natural fiber material and thermoplastic matrix material, and
the amount of the organic natural fiber material is between 10 and 80 wt. % calculated from the total weight of the composite product,
the amount of the matrix material is between 5 and 95 wt. % calculated from the total weight of the composite product, and
density of the composite product is between 0.9 and 1.60 g/cm³ and/or density of the composite product is at least 85% of the theoretical density In an embodiment, the composite product is a final product. In another embodiment, the composite product is an intermediate product.

In an embodiment, the composite product is in form of granulates and weight of 100 granulates is between 2.0 and 4.0 g with a standard deviation under 15%, more preferably under 7%.

Advantageously, the composite product that is dry absorbs moisture under 1.5% from the weight of the composite product in the time of 48 hours (65% RH and 27° C. atmosphere).

Advantageously, a system for manufacturing a composite product comprising an organic natural fiber material and a matrix material comprises
a first mixer to mix the organic natural fiber material with the matrix material in a primary mixing stage to form a mixture. The primary mixing stage comprises a contacting step, in which
the organic natural fiber material comes in contact with the matrix material that is at least partly in a form of melt, and
a bulk density of the organic natural fiber material is less than 500 kg/m³.

Preferably the system further comprises means for forming the composite product comprising the mixture. The means for forming the composite product may be included in the first mixer, or they may be a separate apparatus.

Thanks to the present invention, at least some of the following technical effects may be achieved
Wetting of the organic natural fiber material with the matrix material can be secured during the primary mixing stage. Therefore, the organic natural fiber material can be spread evenly among the matrix material and the fibers of the organic natural fiber material can be wetted evenly with the matrix material.
Forming of covalent or strong physical bonds or strong mechanical attachment can be prevented between fibers of the organic natural fiber material during the primary mixing stage.
Adhesion of the fibers of the organic natural fiber material to the matrix material can be secured.
The composite product can be achieved without fiber agglomerates.
Light color can be achieved.
Dispersion of the composite product can be good.

Particle size distribution of the raw materials of the composition product can be controlled.

In an embodiment, raw materials used are lignin free.

DESCRIPTION OF THE DRAWINGS

The accompanying figures, which are included to provide a further understanding of the invention and constitute a part of this specification, illustrate some embodiments of the invention and together with the description help to explain the principles of the invention.

DETAILED DESCRIPTION OF THE INVENTION

Figure 1:
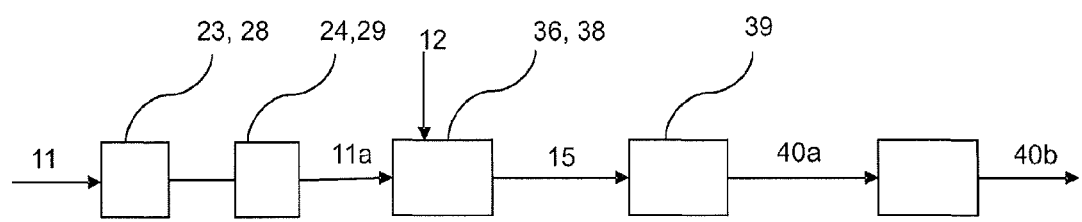
FIGS. 1 to 6 show reduced flow chart illustrations of embodiments of the present invention.

In the following disclosure, all percentages are by dry weight, if not indicated otherwise.

The following reference numbers are used in this application:
11 organic natural fiber material,
11a bulky organic natural fiber material,
12 matrix material,
15 mixture comprising organic natural fiber material and matrix material,
20 pre-treatment stage(s),
21 pre-mixing stage,
21a pre-mixing step of the organic natural fiber material,
21b pre-mixing step of the unmelted matrix material and the organic natural fiber material,
23 pre-crushing stage, crushing,
24 pre-separation stage,
25 chemical treatment,
27 pre-mixing apparatus,
28 crusher, crushing device,
29 separator,
30 primary treatment stage(s),
36 primary mixing stage,
36a contacting step of the primary mixing stage,
36b mixing step of the primary mixing stage,
37 means for the primary treatment stage(s),
38 apparatus for the primary mixing,
39 means for forming a composite product, for example an extruder,
39a first step for forming a composite product,
39b second step for forming a composite product,
40 composite product,
40a intermediate composite product, and
40b final composite product.

In an embodiment of the present invention, a composite product comprising organic natural fiber material 11, 11a and matrix material 12 is formed. Advantageously, the organic natural fiber material has been dried and then crushed by a grinding device 28, after which the organic natural fiber material 11a is mixed with at least partly melted matrix material 12, preferably without compression, to form mixture 15. Advantageously, the matrix material is melted in a phase in which the organic natural fiber material adheres to the melt matrix material and, hence, the organic natural fiber material becomes wet by the matrix material.

In this application, the terms "pressure compressing" and "compressing" mean pressure that is above a gas pressure of the ambient gas and hence compresses a material. For example, in the case of the organic natural fiber material, the pressure compressing the organic natural fiber material means pressure that compresses the organic natural fiber material and, therefore, may increase the bulk density of the organic natural fiber material.

The term "organic natural fiber material 11, 11a" refers to particles that contain cellulose. In other words, the organic natural fiber material can originate from any plant material that contains cellulose, i.e. both wood material and non-wood material can be used.

The wood material can be softwood trees, such as spruce, pine, fir, larch, douglas-fir or hemlock, or hardwood trees, such as birch, aspen, poplar, alder, eucalyptus, or acacia, or a mixture of softwoods and hardwoods. Non-wood material can be agricultural residues, grasses or other plant substances such as straw, coconut, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo, or reed.

Advantageously, at least 30 wt. % or at least 40 wt. %, more preferably at least 50 wt. % or at least 60 wt. %, and most preferably at least 80 wt. % or at least 90 wt. % of the organic natural fiber material is wood based. Advantageously, at least 30 wt. % or at least 40 wt. %, more preferably at least 50 wt. % or at least 60 wt. %, and most preferably at least 80 wt. % or at least 90 wt. % of the organic natural fiber material comes from hardwood. In this case, preferably at least 30 wt. % or at least 40 wt. %, more preferably at least 50 wt. % or at least 60 wt. %, and most preferably at least 80 wt. % or at least 90 wt. % of the hardwood is birch and/or eucalyptus. Alternatively or in addition, at least 30 wt. % or at least 40 wt. %, more preferably at least 50 wt. % or at least 60 wt. %, and most preferably at least 80 wt. % or at least 90 wt. % of the organic natural fiber material comes from softwood. However, the total amount of the softwood and the hardwood in the organic natural fiber material is not more than 100 wt. %. Preferably, at least 30 wt. % or at least 40 wt. %, more preferably at least 50 wt. % or at least 60 wt. %, and most preferably at least 80 wt. % or at least 90 wt. % of the softwood is pine or spruce.

The organic natural fiber material can be in the form of fibers, such as floccules, single fibers, or parts of single fibers, or the organic natural fiber material can be in the form of fiber-like particles, such as saw dust or grinded material, where the material does not have an exactly spherical form, but the longest dimension of particle is preferably less than 5 times longer than the smallest dimension.

Preferably the organic natural fiber material is, at least partly, in the form of fibers. Preferably at least 40 wt. % or at least 50 wt. %, more preferably at least 60 wt. % or at least 70 wt. % and most preferably at least 80 wt. % of the organic natural fiber materials are in the form of fibers. In this application, the organic natural fiber material having a length of at least 0.1 mm, more preferably at least 0.2 mm and most preferably at least 0.3 mm are called fibers, and smaller particles than those mentioned above are called powder or fiber-like particles. Preferably at least 70%, at least 80% or at least 90% of the organic natural fiber material has a length weighted fiber length of under 4 mm, under 3 mm or under 2.5 mm, more preferably under 2.0 mm, under 1.5 mm, under 1.0 mm or under 0.5 mm. Preferably, at least 70%, at least 80%, or at least 90% of the organic natural fiber material has a length weighted fiber length of at least 0.1 mm or at least 0.2 mm, more preferably at least 0.3 mm or at least 0.4 mm. Advantageously, the fiber has a shape ratio relating to the ratio of the fiber length to the fiber thickness being at least 5, preferably at least 10, more preferably at least 25 and most preferably at least 40. In addition or alternatively, the fiber has a shape ratio relating to the ratio of the fiber length to the fiber thickness being preferably 1500 at the most, more preferably 1000 at the most, and most preferably 500 at the most. In an example, the fiber length is measured using a so-called Fiberlab measuring device, manufactured by Metso.

Advantageously, the organic natural fiber material 11, 11*a* comprises fibers in a flake form. Flakes are fibers having a width that is at least 2 times larger than the thickness of the fibers. Advantageously, the width of the flake is at least 2, preferably at least 2.5, and more preferable at least 3 times the thickness of the flake. Preferably, the flakes have a thickness between 1 micron and 30 micrometers and more preferably the thickness of flakes varies from 2 microns to 20 micrometers. Most preferably the thickness of flakes is under 15 µm, more preferable under 10 µm and most preferable under 7 µm. In one embodiment, the width of the flake is under 500 µm, preferably under 200 µm, and more preferable under 50 µm. Preferably, an aspect ratio relating to the ratio of the length to the width is between 10 and 100. Preferably, an aspect ratio relating to the ratio of the length to the thickness is less than 1500 or less than 1000, more preferable less than 500 and most preferably between 25 and 300. In one embodiment, the length of the flake is at least 10 times the width of the flake. In one embodiment the flake has a tabular shape. In one embodiment the flake has a platy shape. In one embodiment, the organic natural fiber material contains flake-form fiber material at least 30 dry wt. %, preferably at least 50 dry wt. % and more preferable at least 70 dry wt. % of the total amount of the organic natural fiber material.

The organic natural fiber material may comprise mechanically treated and/or chemically treated fibers and/or fiber-like particles.

The mechanically treated organic natural fiber material may comprise, among other things, wood flour, saw dust, chip material, and/or mechanical pulp such as TMP (thermo mechanical pulp), GW (groundwood pulp)/SGW (stone groundwood pulp), PGW (pressure groundwood pulp), RMP (refiner mechanical pulp), and/or CTMP (chemithermomechanical pulp). The mechanically treated organic natural fiber material preferably comprises or consists of wood particles, such as wood fibers, but they may also comprise or consist of non-wood material. The mechanically treated organic natural fiber material may comprise recycled and/or virgin particles, such as fibers or fiber-like particles. Advantageously at least 30 wt. % or at least 40 wt. %, more preferably at least 50 wt. % or at least 60 wt. %, and most preferably at least 80 wt. % or at least 90 wt. % of the organic natural fiber material used are virgin. Typically, for example, wood plastic composites (WPC) comprise saw dust or at least other mechanically treated wood or plant particles as main organic natural fiber material.

The chemically treated organic natural fiber material preferably comprises chemical pulp. The chemical pulp may be, for example, from kraft process or sulfite process, but also other chemical processes may be used, such as a soda pulping process. Preferably, the chemical pulp is from the kraft process. The chemically treated organic natural fiber material preferably comprises or consists of wood based cellulose, but it may also be non-wood material. The chemically treated organic natural fiber material may comprise recycled and/or virgin fibers and/or fiber-like particles. Advantageously, at least 30 wt. % or at least 40 wt. %, more preferably at least 50 wt. % or at least 60 wt. %, and most preferably at least 80 wt. % or at least 90 wt. % of the organic natural fiber material used is chemically treated particles. Advantageously, at least 30 wt. % or at least 40 wt. %, more preferably at least 50 wt. % or at least 60 wt. %, and most preferably at least 80 wt. % or at least 90 wt. % of the chemically treated particles used are from kraft process. Advantageously, lignin content of the chemically treated pulp is under 15 wt. %, preferably under 10 wt. % or under 5 wt. %, more preferably under 3 wt. %, under 2 wt. % or under 1 wt. % and most preferably under 0.5 wt. %.

Preferably, the alfa cellulose content of the chemically treated pulp is above 50 wt. %, preferably above 60 wt. %, more preferably above 70 wt. % and most preferably above 72 wt. % or above 75 wt. %. Advantageously, the alfa cellulose content of the chemically treated pulp is below 99 wt. %, preferable below 90 wt. %, more preferably below 85 wt. % and most preferably below 80 wt. %.

Advantageously at least 30 wt. % or at least 40 wt. %, more preferably at least 50 wt. % or at least 60 wt. %, and most preferably at least 80 wt. % or at least 90 wt. % of the organic natural fiber material used are virgin.

Advantageously, lignin content of the organic natural fiber material is under 15 wt. %, preferably under 10 wt. % or under 5 wt. %, more preferably under 3 wt. % or under 1 wt. % and most preferably under 0.5 wt. %. The lignin content may be low due to delignification process, or the lignin content of the organic natural fiber material may be naturally on a low level. Advantageously, the lignin content of the organic natural fiber material is at least 0.05 wt. %, more preferably at least 0.10 wt. % or at least 0.2 wt. % and most preferably at least 0.3 wt. %. In an embodiment, lignin content of the organic natural material is more than 3 wt. %, more than 5 wt. % or more than 10 wt. %.

In an embodiment, at least part of the organic natural fiber material is in the form of paper sheet or web, board sheet or web, pulp sheet or web, or compacted fiber matrix or pieces of compacted fibers and their combinations.

In an embodiment, at least part of the organic natural fiber material is in the form of large fiber or fiber bundles, paper chaff, pulp chaff, crushed pulp material, derivates thereof and their combinations.

In an embodiment, at least part of the organic natural fiber material is in the form of viscose fibers. However, preferably the amount of the organic natural fiber material is calculated as the total amount of the untreated and/or in the above-mentioned way mechanically treated, and/or in the above-mentioned way chemically treated organic natural fiber material in the system or product, and does not comprise the viscose fibers. Advantageously the amount of the viscose fibers is less than 5 wt. % or less than 4 wt. %, more preferably less than 3 wt. % or less than 2 wt. %, and most preferably less than 1 wt. %, less than 0.5 wt. % or less than 0.1 wt. % calculated from the total amount of the organic natural fiber material.

In this application, the term "matrix material 12" means material which can preferably be several times formed into a new shape when it is heated. This material keeps its new shape after cooling and then it flows very slowly, or it does not flow at all. The matrix material has at least one repeat unit, and molecular weight of the matrix material is over 18 g/mol, preferably over 100 g/mol, over 500 g/mol, or over 1000 g/mol, more preferably over 10 000 g/mol or over 100 000 g/mol.

The matrix material 12 comprises preferably thermoplastic material; hence, the matrix material includes thermoplastic components. Advantageously, the amount of the thermoplastic material in the matrix material is at least 80 wt. %, more preferably at least 90 wt. %, and most preferably at least 95 wt. %. Advantageously, the matrix material comprises at least one crystalline polymer and/or at least one non-crystalline polymer, and/or at least one crystalline oligomer and/or at least one non-crystalline oligomer.

Advantageously, the matrix material comprises, in addition to the thermoplastic polymers, polymeric coupling agent(s). Polymeric coupling agent preferably contains moiety or moieties, which are reactive or at least compatible with the matrix material and moiety or moieties, which are reactive or at least compatible with the organic natural fiber material. If the matrix material is non-polar, the moiety or moieties, which are reactive or compatible with the matrix material, are preferably non-polar. If the matrix material is polar, the moiety or moieties, which are reactive or compatible with the matrix material, is/are preferably polar. Preferable polymeric coupling agent contains the same repeat units as the matrix material used. Advantageously at least 30 wt. % or at least 40 wt. %, more preferably at least 50 wt. % or at least 60 wt. %, and most preferably at least 80 wt. % or at least 85 wt. % of the moieties of the polymeric coupling agent are chemically the same as in the matrix material. Advantageously said moiety or moieties which is/are reactive or at least compatible with the organic natural fiber material comprise(s) anhydride(s), acid(s), alcohol(s), isocyanate(s), and/or aldehyde(s). Preferably, the coupling agent is acrylic acid grafted polymer. Alternatively or in addition, the coupling agent is methacrylic acid grafted polymer. Most preferably, the coupling agent comprises or consists of maleinic acid anhydride grafted polymer. The coupling agent can, in principle, be any chemical which is able to improve the adhesion between two main components. This means that it may contain components, which are known to be reactive or compatible with matrix material and components, which are known to be reactive or compatible with the organic natural fiber material.

Advantageously the coupling agent comprises or consists of
  anhydrides, preferably maleic anhydride (MA),
  polymers and/or copolymers, preferably maleated polyethylene (MAPE), Maleated polypropylene (MAPP), Styrene-ethylene-butylene-styrene/maleic anhydride (SEBS-MA), and/or Styrene/maleic anhydride (SMA), and/or
  organic-inorganic agents, preferably silanes and/or alkoxysilanes.

Preferably, at least 50 wt. %, at least 60 wt. %, more preferably at least 70 wt. % or at least 80 wt. % and most preferably at least 90 wt. % of the coupling agents used are
  anhydrides, preferably maleic anhydride (MA), and/or
  polymers and/or copolymers, preferably maleated polyethylene (MAPE), Maleated polypropylene (MAPP), Styrene-ethylene-butylene-styrene/maleic anhydride (SEBS-MA), and/or Styrene/maleic anhydride (SMA), and/or
  Organic-inorganic agents, preferably silanes and/or alkoxysilanes.

Advantageously, the matrix material 12 comprises thermoplastic polymer based matrix material and/or thermoplastic oligomer based matrix material. Thermoplastic polymers are often solid at the low temperature and they form viscose polymer melt at the elevated temperatures. Typically the viscosity of these polymer decreases when temperature is increased, and the polymers flow and wet the surfaces more easily. When thermoplastic composites are produced, polymer is heated in order to melt the polymer, and other components of the composites are mixed with the polymer melt. Often it is easy to mix these other components into polymer when the viscosity of the polymer is low, meaning that the temperature of the polymer melt is high.

The matrix material is, at least partly, in melt form, when
  the organic natural material can adhere to the matrix material, and/or
  the melt flow index of the material can be measured (according to standard ISO 1133 (valid in 2011)), and/or
  the organic natural fibre material can adhere to the surfaces of matrix material particles.

Preferably at least 10% or at least 30%, more preferably at least 50% or at least 70% and most preferably at least 80% or at least 90% of the matrix material is in melt form in the contacting step of the primary mixing stage.

Preferably, at least 20% or at least 40%, more preferably at least 60% or at least 80% and most preferably at least 90% or at least 95% of the matrix material is in melt form at least momentarily during the primary mixing stage.

The polymer based matrix material contains one or more polymers, and the oligomer based matrix material contains one or more oligomers. The total amount of the polymers and oligomers calculated from the total amount of the matrix material is preferably at least 80 wt. %, at least 85 wt. %, at least 90 wt. %, at least 95 wt. % or at least 98 wt. %.

If the matrix material comprises polymer, it may be any suitable polymer or polymer composition. Advantageously, the matrix material contains at least 50 wt. %, at least 60 wt. %, more preferably at least 70 wt. %, or at least 80 wt. %, and most preferably at least 90 wt. % or at least 95 wt. %:
  polyolefin, e.g. polyethylene and polypropylene,
  polystyrene,
  polyamide,
  polyester,
  ABS (acrylic nitrile butadiene styrene copolymer),
  polycarbonate,
  biopolymer, e.g. polylactide,
  biodegradable polymer,
  bio-based polymer,
  thermoplastic elastomer,
  polysaccharides,
  lignin, and/or
  their derivatives.

The matrix material 12 may contain one or more polymer material components. Advantageously, at least one polymer is selected from the group consisting of polyethylene, polypropylene and their combinations. Advantageously, the amount of polypropylene and polyethylene in the matrix material is at least 50 wt. %, at least 60 wt. %, at least 70 wt. %, at least 80 wt. %, at least 90 wt. % or at least 95 wt. %.

Advantageously, the melting point of the matrix material is under 250° C., preferably under 220° C., and more preferable under 190° C. Advantageously, the glass transition temperature of the matrix material is under 250° C., preferably under 210° C., and more preferable under 170° C.

Advantageously, melt flow rate, MFR, of the matrix material is under 1000 g/10 min (230° C., 2.16 kg defined by ISO 1133, valid 2011), more preferable 0.1-200 g/10 min, most preferable 0.3-150 g/10 min. Advantageously, melt flow rate, MFR, of the matrix material is over 0.1 g/10 min (230° C., 2.16 kg defined by ISO 1133, valid 2011), more preferable over 1 g/10 min, most preferable over 3 g/10 min.

FIGS. 1 to 6 show reduced flow chart illustrations of some example embodiments of the present invention.

In FIG. 1, the organic natural fiber material 11, 11a is first crushed in a pre-crushing stage 23 comprising a crusher 28, after which it is treated in a pre-separation stage 24 comprising a separator 29. The formed bulky organic natural fiber material 11a is combined with the matrix material 12 in a primary mixing stage 36, 38 in order to form a mixture 15. A composite product 40, 40a, 40b is formed, which composite product comprises the mixture 15.

Figure 2:
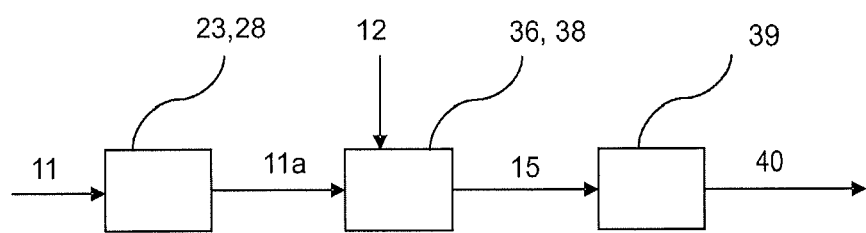

In FIG. 2 the organic natural fiber material 11, 11a is first crushed in a pre-crushing stage 23, 28, after which the bulky organic natural fiber material 11a is combined with the matrix material 12 in a primary mixing stage 36, 38 in order to form a mixture 15. A composite product 40, 40a, 40b is formed, which composite product comprises the mixture 15.

Figure 3:
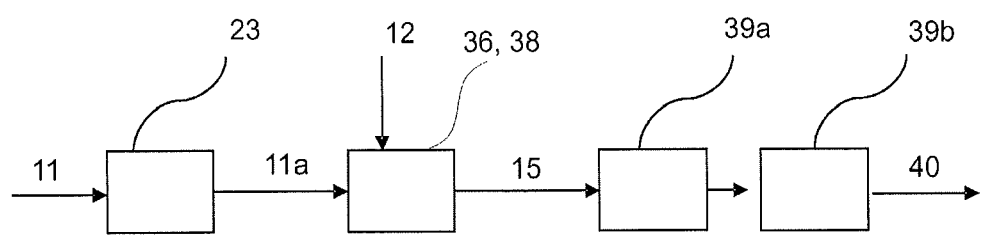

In FIG. 3 the organic natural fiber material 11, 11a is first crushed in a pre-crushing stage 23, after which the bulky organic natural fiber material 11a is combined with the matrix material 12 in a primary mixing stage 36, 38 in order to form a mixture 15. A composite product 40, 40a, 40b comprising the mixture 15 is formed in at least two process steps 39a, 39b.

Figure 4:
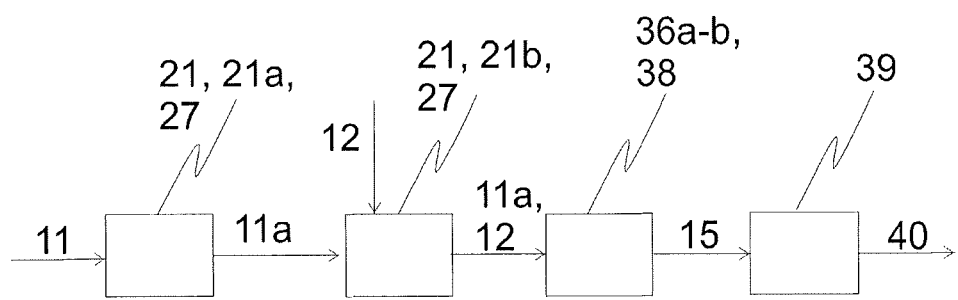

In FIG. 4 the organic natural fiber material 11, 11a is first mixed in a pre-mixing stage 21, 21a, 27, after which the bulky organic natural fiber material 11a is combined with a solid matrix material 12 in the second pre-mixing stage 21, 21b, 27. The solid matrix material 12 is then at least partly melted and the matrix material and the bulky organic natural fiber material 11a are mixed with each other in a primary mixing stage 36a-b, 38 in order to form a mixture 15. A composite product 40 is formed, which composite product comprises the mixture 15.

Figure 5:
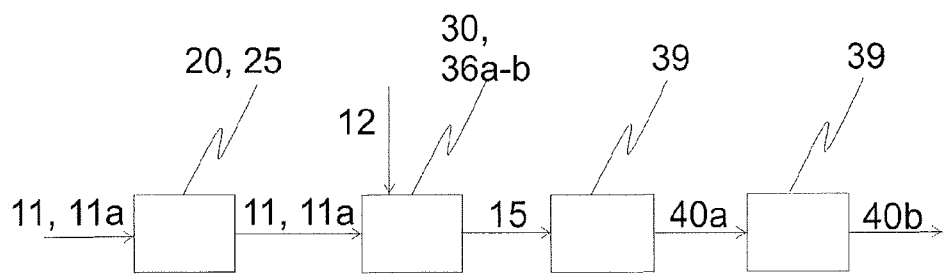

In FIG. 5 the organic natural fiber material 11, 11a is first pre-treated in a pre-treatment stage 20, 25, after which the bulky organic natural fiber material 11a is combined with the matrix material 12 in the primary mixing stage 30, 36a-b, 38 in order to form the mixture 15. In addition, a composite product 40a, 40b comprising the mixture 15 is formed.

Figure 6:
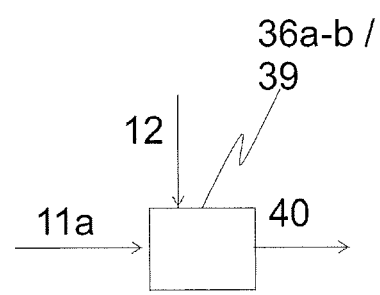

In FIG. 6, the bulky organic natural fiber material 11, 11a is combined with the matrix material 12 in a primary mixing stage 36, 38 comprising means 39, such as an extruder, for forming a composite product 40, 40a, 40b.

Advantageously, the matrix material 12 is mixed with the organic natural fiber material 11, 11a in a primary mixing stage 36. The primary mixing stage 36 comprises a contacting step 36a wherein at least partly melted matrix material contacts the organic natural fiber material, and a mixing step 36b, in which the at least partly melted matrix material is mixed with the organic natural fiber material. Advantageously, the organic natural fiber material used is bulky before it is mixed with the at least partly melted matrix material.

The term "bulky" can be defined as certain bulk density of the organic natural fiber material. Bulk density is defined as the mass of particles that occupies a unit volume of a container. Bulk density of granular and powdery materials can be determined by the ratio of the mass to a given volume. Determination of bulk density can be done, for example, by filling a container of known dimensions and weight with the material of interest and by weighing the container containing the material of interest. Bulk density depends on particle size, particle form, material composition, moisture content, as well as on material handling and processing operations. For example, rounded particles will be closer together when poured into a container compared to non-spherical particles, such as fibers.

In this application, the bulk density means
1) apparent bulk density of the organic natural fiber material, and
2) calculated bulk density of the organic natural fiber material.

The apparent bulk density is measured bulk density of the organic natural fiber material, and it is typically neither compressed nor decompressed. The calculated bulk density depends on the amount of organic natural fiber material in a certain volume, and it comprises also compressed and decompressed bulk densities.

Bulk density ρ of the organic natural fiber material is calculated by dividing the weight of the sample by its volume as follows:

$$\rho = \frac{\text{mass of fibre}}{\text{volume of fibre}} \qquad \text{Eq. (1)}$$

Organic fiber material is, however, very soft and bulky and that is why the bulk density can be increased a great deal by compressing or pressing the organic natural fiber material.

The determination of bulk density can be done, for example, according to ISO 697 and ISO 60 (valid 2011), and their counterparts in other standards organizations, and by other similar measurement procedures that would ensure reasonable results in the determination of bulk density. In addition, bulk density can be determined with devices such as Powder Characteristics Tester by Hosokawa and Powder Flow Tester by Brookfield, and with other similar devices intended for determination of different characteristics of powdery materials. Bulk density can also be measured by suitable laboratory and on-line measurement sensors including, but not limited to, techniques based on microwaves. Bulk density of organic natural fiber material can be determined as described above. Preferably, the bulk density values are measured according to Example 21.

Calculated bulk density $\rho_{calculated}$ is the bulk density the organic fiber material would have, if the material would be evenly distributed to the volume that is available at given time. Calculated bulk density $\rho_{calculated}$ of fiber for batch, i.e. discontinuous, process can be determined as follows:

$$\rho_{calculated} = \frac{\text{mass of fibre}}{\text{available, free volume of mixer}} \qquad \text{Eq. (2)}$$

and for continuous process like this:

$$\rho_{calculated} = \frac{\text{mass flow of fibre}}{\text{conveying volumetric flow of mixer}} \qquad \text{Eq. (3)}$$

Advantageously, bulk density of the organic natural fiber material (i.e. calculated bulk density and/or apparent bulk density) before the contacting step is under 800 kg/m$^3$, under 700 kg/m$^3$, under 500 kg/m$^3$, under 300 kg/m$^3$, or under 250 kg/m$^3$, more preferably under 200 kg/m$^3$, under 180 kg/m$^3$, or under 150 kg/m$^3$. Most advantageously, bulk density of the organic natural fiber material is at least 10 kg/m$^3$, at least 15 kg/m$^3$, or at least 20 kg/m$^3$, more preferably at least 30 kg/m$^3$, or at least 40 kg/m$^3$, and most preferably at least 50 kg/m$^3$. Alternatively or in addition, bulk density of the organic natural fiber material is at least 10 kg/m$^3$, at least 15 kg/m$^3$, or at least 20 kg/m$^3$, more preferably at least 30 kg/m$^3$, or at least 40 kg/m$^3$, and most preferably at least 50 kg/m$^3$. Then the organic natural fiber material can be incorporated to matrix material easily.

Compression ratio R can be calculated if calculated bulk density and apparent bulk density are known. Compression ratio R can be calculated according to equation:

$$R = \frac{\rho_{calculated}}{\rho} \qquad \text{Eq. (4)}$$

where $\rho_{calculated}$ is the calculated bulk density of organic natural fiber material and $\rho$ is the apparent bulk density of organic natural fiber material. Herein, the mass of fiber and mass flow of fiber are based on the dry mass of the fibers, i.e. the amount of moisture present in the organic natural fiber material is subtracted in the measurements and calculations.

The compression ratio R of the organic natural fiber material is often a very important feature because, until the fibers are at least partly surrounded by the matrix material, the organic natural fibers will create bonds with each other and, hence, form flocks. These organic natural fiber material flocks may decrease the quality of the manufactured composite product comprising said organic natural fiber material. Many other fiber materials, such as glass fibers, do not create similar bonds and flocks under pressure and, thus, this phenomenon is not as important for them as for the organic natural fiber material.

If the compression ratio R of the organic natural fiber material in the contacting step of the primary mixing stage is large, the contacting of the organic natural fiber material and the matrix material is made with some compression to the fibers. This may make the conditions unfavorable for good wetting of fibers, and thus dispersion of fibers to matrix is typically poor. Therefore, the compression ratio R of the organic natural fiber material composition in the contacting step 36$a$ of the primary mixing stage 36 is preferably less than 8, less than 7 or less than 6, more preferably less than 5 or less than 4, and most preferably less than 3 or less than 2.

Advantageously, the compression ratio R of the organic natural fiber material 11, 11$a$ in the contacting step 36$a$ of the primary mixing stage 36 is not more than 8, for example between 0.2 and 8, more preferably not more than 6, for example between 0.2 and 6 or between 0.5 and 6, and most preferably not more than 4, for example between 0.2 and 4 or between 0.8 and 4 when the apparent bulk density is 0<bulk density<20 g/l.

Alternatively or in addition, the compression ratio R of the organic natural fiber material 11, 11$a$ in the contacting step 36$a$ of the primary mixing stage 36 is not more than 8, for example between 0.2 and 8, more preferably not more than 6, for example between 0.2 and 6 or between 0.5 and 6, and most preferably not more than 4, for example between 0.2 and 4 or between 0.8 and 4 when the calculated bulk density is 0<bulk density<20 g/l.

Advantageously, the compression ratio R of the organic natural fiber material in the contacting step of the primary mixing stage is not more than 6, for example between 0.2 and 6, more preferably not more than 4, for example between 0.2 and 4 or between 0.5 and 4, and most preferably not more than 3, for example between 0.2 and 3 or between 0.8 and 3, when the apparent bulk density is 20≤bulk density<40 g/l.

Alternatively or in addition, the compression ratio R of the organic natural fiber material in the contacting step of the primary mixing stage is not more than 6, for example between 0.2 and 6, more preferably not more than 4, for example between 0.2 and 4 or between 0.5 and 4, and most preferably not more than 3, for example between 0.2 and 3 or between 0.8 and 3, when the calculated bulk density is 20≤bulk density<40 g/l.

Advantageously, the compression ratio R of the organic natural fiber material in the contacting step of the primary mixing stage is not more than 4, for example between 0.2 and 4.0, more preferably not more than 3, for example between 0.2 and 3.0 or between 0.5 and 3.0, and most preferably not more than 2.5, for example between 0.2 and 2.5 or between 0.8 and 2.5 when the apparent bulk density is 40≤bulk density<80 g/l.

Alternatively or in addition, the compression ratio R of the organic natural fiber material in the contacting step of the primary mixing stage is not more than 4, for example between 0.2 and 4.0, more preferably not more than 3, for example between 0.2 and 3.0 or between 0.5 and 3.0 and most preferably not more than 2.5, for example between 0.2 and 2.5 or between 0.8 and 2.5 when the calculated bulk density is 40≤bulk density<80 g/l.

Advantageously, the compression ratio R of the organic natural fiber material in the contacting step of the primary mixing stage is not more than 3.0, for example between 0.2 and 3.0, more preferably not more than 2.5, for example between 0.2 and 2.5 or between 0.5 and 2.5 and most preferably not more than 2.0, for example between 0.2 and 2.0 or between 0.8 and 2.0 when the apparent bulk density is 80≤bulk density<150 g/l.

Alternatively or in addition, the compression ratio R of the organic natural fiber material in the contacting step of the primary mixing stage is not more than 3.0, for example between 0.2 and 3.0, more preferably not more than 2.5, for example between 0.2 and 2.5 or between 0.5 and 2.5 and most preferably not more than 2.0, for example between 0.2 and 2.0 or between 0.8 and 2.0 when the calculated bulk density is 80≤bulk density<150 g/l.

Advantageously, the compression ratio R of the organic natural fiber material in the contacting step of the primary mixing stage is not more than 2.5, for example between 0.2 and 2.5, more preferably not more than 2.0, for example between 0.2 and 2.0 or between 0.5 and 2.0 and most preferably not more than 1.5, for example between 0.2 and 1.5 or between 0.8 and 1.5 when the apparent bulk density is 150≤bulk density<300 g/l.

Alternatively or in addition, the compression ratio R of the organic natural fiber material in the contacting step of the primary mixing stage is not more than 2.5, for example between 0.2 and 2.5, more preferably not more than 2.0, for example between 0.2 and 2.0 or between 0.5 and 2.0 and most preferably not more than 1.5, for example between 0.2 and 1.5 or between 0.8 and 1.5 when the calculated bulk density is 150≤bulk density<300 g/l.

Advantageously, the compression ratio R of the organic natural fiber material in the contacting step of the primary mixing stage is not more than 2.0, for example between 0.2 and 2.0, more preferably not more than 1.5, for example between 0.2 and 1.5 or between 0.5 and 1.5 and most preferably not more than 1.2, for example between 0.2 and 1.2 or between 0.8 and 1.2 when the apparent bulk density is at least 300 g/l, for example between 300≤bulk density<700 g/l.

Alternatively or in addition, the compression ratio R of the organic natural fiber material in the contacting step of the primary mixing stage is not more than 2.0, for example between 0.2 and 2.0, more preferably not more than 1.5, for example between 0.2 and 1.5 or between 0.5 and 1.5 and most preferably not more than 1.2, for example between 0.2 and 1.2 or between 0.8 and 1.2 when the calculated bulk density is at least 300 g/l, for example between 300≤bulk density<700 g/l.

Advantageously, the calculated bulk density of the organic natural fiber material 11, 11a in the contacting step 36a of the primary mixing stage 36 is less than 80 g/l, more preferably less than 60 g/l and most preferably less than 40 g/l when the apparent bulk density is less than 10 g/l.

Advantageously, the calculated bulk density of the organic natural fiber material in the contacting step of the primary mixing stage is less than 160 g/l, more preferably less than 120 g/l and most preferably less than 80 g/l when the apparent bulk density is between 10≤apparent bulk density<20 g/l.

Advantageously, the calculated bulk density of the organic natural fiber material in the contacting step of the primary mixing stage is less than 240 g/l, more preferably less than 160 g/l and most preferably less than 120 g/l when the apparent bulk density is between 20≤apparent bulk density<40 g/l.

Advantageously, the calculated bulk density of the organic natural fiber material in the contacting step of the primary mixing stage is less than 320 g/l, more preferably less than 240 g/l and most preferably less than 200 g/l when the apparent bulk density is between 40≤apparent bulk density<80 g/l.

Advantageously, the calculated bulk density of the organic natural fiber material in the contacting step of the primary mixing stage is less than 450 g/l, more preferably less than 375 g/l and most preferably less than 300 g/l when the apparent bulk density is between 80≤apparent bulk density<150 g/l.

Advantageously, the calculated bulk density of the organic natural fiber material in the contacting step of the primary mixing stage is less than 750 g/l, more preferably less than 600 g/l and most preferably less than 450 g/l when the apparent bulk density is between 150≤apparent bulk density<300 g/l.

Advantageously, the calculated bulk density of the organic natural fiber material in the contacting step of the primary mixing stage is less than 1400 g/l, more preferably less than 1050 g/l and most preferably less than 840 g/l when the apparent bulk density is at least 300 g/l, for example between 300≤apparent bulk density<700 g/l.

Advantageously, the calculated bulk density of the organic natural fiber material is less than 5 times the apparent bulk density, more preferably less than 3.5 times and most preferably less than 2 times the apparent bulk density.

Advantageously, the calculated bulk density of the organic natural fiber material is at least 0.4 times the apparent bulk density, and preferably at least 0.5 times and more preferable at least 0.6 times the apparent bulk density.

Advantageously, the method according to the present invention comprises at least some of the following steps:
introducing the organic natural fiber material 11, 11a to the system,
introducing the matrix material 12 to the system,
pre-crushing 23 the organic natural fiber material before the primary mixing stage to form a bulky material,
pre-separating 24 the organic natural fiber material before the primary mixing stage 36,
pre-mixing 21, 21a the organic natural fiber material before the primary mixing stage 36,
treating chemically the organic natural fiber material before the primary mixing stage 36,
pre-mixing 21, 21b the organic natural fiber material and unmelted matrix material before the primary mixing stage 36,
melting the matrix material at least partly,
contacting the at least partly melted matrix material with the organic natural fiber material, the organic natural fiber material being preferably bulky in the beginning of the contacting step,
mixing the at least partly melted matrix material with the organic natural fiber material in the primary mixing stage in order to form a mixture,
forming 39 a composite product 40, 40a, 40b comprising the mixture.

The matrix material 12 and the organic natural fiber material 11, 11a are contacted with each other before a contacting step or in a contacting step 36a of the primary mixing stage 36. If the matrix material 12 and the organic natural fiber material 11, 11a are contacted before the contacting step 36a of the primary mixing stage 36, the contacting step does not start until the matrix material at least starts to melt, i.e. at least 10 wt. % of the matrix material is in melt form.

Advantageously, the mixture 15 comprising organic natural fiber material and the melted matrix material is formed so that the organic natural fiber material has been incorporated to the melt matrix material without use of compression during the contacting step. Preferably, the mixing of the primary mixing stage is made without the compression regardless of mixing method and mixing type. However, in an embodiment, the composite product is formed from the mixture under heat and pressure.

Advantageously, the composite product 40 comprising the mixture 15 is formed by a method selected from the group consisting of extrusion, granulation, mixing method, pelletization and their combinations. In one embodiment, the composite product is formed by means of a mixing device, an internal mixer, a kneader, a pelletizer, a pultrusion method, a pull drill method, and/or an extrusion device. Advantageously, the composite product is formed by injection moulding. Alternatively or in addition, the composite product is formed by extrusion.

The matrix material 2 is arranged at least partly in the form of melt at least in the contacting step of the primary mixing stage 36a in which the organic natural fiber material comes in contact with the melt matrix material. During the primary mixing stage 36, the organic natural fiber material becomes wet by the matrix material.

The contacting step 36a means the process place or area, in which the organic natural fiber material comes in contact with the at least partly melted matrix material. Advantageously, the matrix material is in a melt form during the contacting step, i.e. the matrix material is arranged in the form of melt at least in the contacting step in which the organic natural fiber material comes in contact with the melt matrix material. Therefore, the matrix material is preferably heated so that the temperature of the matrix material is higher than the glass transition temperature or, if the matrix material has a melting temperature, the matrix material is heated higher than the glass transition and melting temperatures, before the contacting step of the primary mixing stage starts. In the melting, phase transition is from solid to melt.

The primary mixing stage is preferably a part of a continuous process. However, the primary mixing stage may also be implemented in a batch process.

The organic natural fiber material is preferably bulky, i.e. it is at a predetermined bulk density level before the contacting step of the primary mixing stage starts.

Advantageously, the fibers of the organic natural fiber material are crushed before the contacting step to form a bulky organic natural fiber material composition. Therefore, the organic natural fiber material is preferably pre-crushed 23 by a crusher 28 before the primary mixing stage 36 in order to form bulky material 11a. Advantageously, the pre-crushing 23 is implemented before other pre-treatments, such as chemical treatment 25 and/or pre-separation 24. Alternatively or in addition, the pre-crushing is implemented after chemical treatment 25 and/or pre-separation 24. In one embodiment, bundles of fibers are discharged before the contacting step 36a of the primary mixing stage 36, which can be implemented by at least one crushing device 28. Advantageously, the fiber material is at least partly in the form of flakes after the crushing.

Technical effects of the bulky material are fluency and ability to flow and non-arching. In addition, the fibers and/or the fiber-like material can be spread evenly among the matrix material. Further, the wetting of the fibers can take place evenly.

The pre-crushing 23 can be made in one or more crushing steps by one or more crushing methods. The crushing 23 can be made by any suitable method known to a person skilled in the art. In this context, the crushing 23 means any crushing, grinding, fractionizing, pulverizing and their combinations.

In an embodiment, the organic natural fiber material is pre-crushed 23 by crushing-based grinding, attrition-based grinding, abrasion-based grinding, cutting-based grinding, blasting-based grinding, explosion-based grinding, wet grinding, dry grinding, grinding under pressure or by their combinations. Preferably, the organic natural fiber material is crushed by a crushing-based grinding and/or by a cutting based grinding. Advantageously, the organic natural fiber material is pre-crushed 23 so that during the treatment the fibers are separated and cut. Therefore, most preferably the organic natural fiber material 1 is crushed 23 by the cutting grinding.

Advantageously, an impact mill, an air jet mill, a sand mill, a bead mill, a pearl mill, a ball mill, a vibration mill, and/or a screw mill is used for the pre-crushing 23.

Advantageously, the organic natural fiber material is pre-treated in at least one pre-treatment stage 20. Preferably, the system comprises at least one pre-treatment stage 20 before the contacting step 36a of the primary mixing stage 36. If the system comprises the pre-crushing stage 23, there is preferably also at least one additional pre-treatment stage 20 after the crushing step 23 but before the primary mixing stage 36.

In the pre-treatment stage(s), the organic natural fiber material is not in contact with the at least partly melted matrix material. Thus, the organic natural fiber material and the matrix material are pre-treated separately, or only one of them is pre-treated, and/or the organic natural fiber material is pre-treated with solid matrix material.

Instead of or in addition to the pre-crushing 23, the pre-treatment stage(s) 20 may comprise, for example,
a drying step,
a pre-mixing step 21a of the organic natural fiber material,
a pre-mixing step 21b of the organic natural fiber material and the unmelted matrix material,
a heating step,
a compacting step, and/or
a chemical pre-treatment step 25.

In one embodiment, the pre-treatment stage 20 contains heating, cooling, mixing, agglomeration, pre-granulation, and/or pelleting step. The order of the pre-treatments may vary.

In one embodiment, the fiber material is pre-treated at ambient gas pressure less than 100 bar, more preferably less than 80 bar, less than 60 bar, less than 50 bar, less than 40 or less than 30 bar or less than 20 bar, more preferably less than 15 bar, less than 10 bar, less than 8 bar, less than 6 bar, less than 4 bar or less than 3 bar and most preferably less than 2.5 bar or less than 2.0 bar. The pressure around the organic natural fiber material (for example inside a closed vessel) may be quite high as long as the organic natural fiber material is not compressed too much. In other words, typically the bulk density is the important thing, not simply the air pressure.

The pressure compressing the organic natural fiber material before the contacting step of the primary mixing stage, i.e. the pressure compressing the organic natural fiber material during the pre-treatment, is preferably less than 4 bar or less than 3 bar, more preferably less than 2.5 bar or less than 2.0 bar and most preferably less than 1.5 bar.

In an example embodiment, at least a part of the organic natural fiber material is pre-mixed 21, 21a before the primary mixing stage 36 in such way that fiber agglomerates are disintegrated as well as possible but the fibers are not cut during the mixing. Methods of pre-mixing may include, but are not limited to, blenders, food mixers, concrete-mixers, and fluidization techniques. In one embodiment, the pre-mixing 21, 21a, 21b is carried out by a heating mixer, a cooling mixer, an internal mixer, e.g. Banbury, a continuous mixer and/or some other suitable device.

In one embodiment, the matrix material is pre-mixed 21, 21b with the organic natural fiber material during a pre-treatment step 20. In this case, the matrix material is not melted but the materials are pre-mixed with each other when the matrix material is in a solid form.

In one embodiment, the fibers of the organic natural fiber material are first pre-mixed 21a with each other without compression of the fiber material, and the fiber material is then pre-mixed 21b with the unmelted matrix material without compression so that the mixing of the organic natural fiber material and the matrix material is made without forming of the bonds between fibers of the organic natural fiber material.

In one embodiment, the fibers of the organic natural fiber material are pre-treated with chemical(s) 25, preferably without a heavy compression, in order to improve adhesion. Preferably lubricant(s), waxe(s), compatibilization agent(s), ionic surfactant(s), non-ionic surfactant(s), silane(s), acid anhydride(s) and/or carboxylic acid(s) is used for the chemical pretreatment.

Alternatively or in addition, another chemical(s), which improves the wetting of fibers or adhesion between the organic natural fiber material and the matrix material may be used, especially if the chemical is in liquid form or in gas form or in melt form below temperatures where the matrix material is in solid form.

Advantageously, the pre-treatment 20 comprises a drying step, in which dry matter content of the organic natural fiber material is increased. Preferably, after the pre-treatment, the moisture content of the organic natural fiber material is preferably less than 7%, less than 6%, less than 5%, less than 4%, or less than 3%, more preferably less than 2.5%, less than 2.0%, less than 1.5% or less than 1.0%, and most preferably less than 0.8% or less than 0.5%.

In an example, the pre-treatment 20 comprises the chemical treatment 25 and the drying steps and the chemical treatment is implemented before or during the drying step.

Advantageously, the fibers of the organic natural fiber material are separated (i.e. classified/sorted) in a pre-separation stage 24 before the contacting step 36a of the primary mixing stage and before the wetting of the fibers therein.

In this application, the primary mixing stage 36 means a process step which starts when the organic natural fiber material comes in contact with the matrix material that is at least partly in melt form and stops when the organic natural fiber material has become wet by the matrix material in whole or substantially in whole, or the surfaces of the organic fiber material are covered by the matrix material so much that the adhesion of fibers is prevented, when the material is pressed afterwards. Preferably, at least 40% or at least 50%, more preferably at least 60% or at least 70% and most preferably at least 80% or at least 90% of the surface area of the organic natural fiber material are covered by the matrix material after the primary mixing stage 36 and in the composite product 40.

Therefore, the primary mixing stage 36 and the contacting step 36a therein starts when the organic natural fiber material 11, 11a and the matrix material 12 are in contact with each other and the matrix material is melted or starts to melt and, hence, the primary mixing stage 36 starts when the matrix material starts to wet the surfaces of the organic natural fiber material. Therefore, it is possible that the organic natural fiber material and the matrix material are in contact with each other already before the primary mixing stage if the matrix material is in solid form.

Preferably, the primary mixing stage continues at least until the polymer is totally melted. In other words, the mixing continues at least until the fibers of the organic natural fiber material cannot bound with each other anymore. The fiber material and additives are now dispersed with the polymer melt. During the forming of the composite product 40, the homogeneous composite material is preferably cooled until the material is totally solid.

The moisture content of the natural organic fiber material in the contacting step 36a and/or just before the contacting step is preferably less than 7%, less than 6%, less than 5%, less than 4%, or less than 3%, more preferably less than 2.5%, less than 2.0%, less than 1.5% or less than 1.0%, and most preferably less than 0.8% or less than 0.5%. A technical effect of this is that the wetting of the organic natural fiber material and mixing and adhesion between the matrix material and organic natural fiber material can be improved and the flocculation of the organic natural fiber material may be avoided because in this case the coupling agent may not react first with water but it reacts with the organic natural fiber material.

The organic natural fiber material is mixed with the melted matrix material to form a mixture comprising at least said organic natural fiber material and the matrix material. Advantageously, the matrix material is in the form of melt during the mixing 36b until a substantial amount, preferably at least 30%, at least 40%, at least 50%, at least 60%, at least 70%, at least 80% or at least 90% of fiber surfaces are wet by the matrix material.

Preferably, such pressure is used that bonds between fibers are not formed, i.e. the mixing of the fiber based starting material and matrix material is made without forming of the bonds between fibers of the fiber material. In a preferred embodiment, the fiber material is incorporated to matrix material at least without or with a small compression and preferably also without pressure substantially over atmospheric pressure. Advantageously, the fiber material is mixed with matrix material without compression to form a mixture.

Pressure compressing the organic natural fiber material during the contacting step of the primary mixing stage is preferably less than 5 bar, less than 4 bar or less than 3 bar, more preferably less than 2.5 bar, less than 2.0 bar, less than 1.5 bar or less than 1.0 bar and most preferably less than 0.5 bar, less than 0.3 bar, less than 0.2 bar or less than 0.1 bar.

Preferably, the organic natural fiber material is mixed lightly with the matrix material in the primary mixing stage 36 in order to form the mixture so that the mixing is made without heavy compression, and the organic natural fiber material is evenly distributed to a mixing volume, preferably to a free volume of a mixing area.

For example, a Z-blade mixer, a batch type internal mixer, an extruder, a heating mixer and/or a heating/cooling mixer is used for the mixing step 36b of the primary mixing stage. Advantageously a mixer comprising a heating section is used. The mixer preferably comprises a section wherein at least some of the moisture coming from the raw materials can be removed. The organic natural fiber material and the matrix material can be mixed and agglomerated to a homogeneous or substantially homogeneous mixture. The fiber content may be adjustable within a wide range, and high contents may be easy to achieve.

Suitable and desired additives can be added into the organic natural fiber material, the matrix material and/or the mixture comprising the matrix material and the organic natural fiber material. Advantageously, at least one additive comprising
property enhancers,
coupling agent,
adhesion promoter,
lubricant,
rheology modifiers,
releaser agent,
fire retardant,
coloring agent,
anti-mildew compound,
protective agent,
antioxidant,
uv-stabilizer,
foaming agent,
curing agent,
coagent, and/or
catalyst
is used.

Advantageously, at least one filler comprising fibrous material, organic fillers like starch or protein or some organic residues, inorganic fillers, powdery reinforcements, calcium carbonate and/or talc is used. The total amount of the fillers is preferably less than 50 wt. %, more preferably less than 40 wt. %, and most preferably less than 30 wt. % calculated from the total weight of the composite product.

Advantageously, at least one additive and/or at least one filler are added into the mixture comprising the organic natural fiber material and the matrix material. Most advantageously, coupling agent is polymeric coupling agent which is included in the matrix material.

In one embodiment of the invention, the organic natural fiber material is at least partly in the form of flakes before the contacting step of the primary mixing stage. In one embodiment, any flake-form fiber material can be used as an organic natural fiber material or as a part of an organic natural fiber material.

Advantageously, in the primary mixing stage and at least in the contacting step of the primary mixing stage, the materials are preferably mixed in vacuum or in the presence of gas. If gas is used, advantageously the gas comprises or consists of air and/or nitrogen and/or helium.

In one embodiment, the composite product 40 is in the form of particles. This kind of composite product is typically an intermediate composite product 40a. In this application, the composite particle refers to any granulate, agglomerate, pellet or the like. The composite product in the form of particles is preferably formed by a granulation method, a pelleting method, an agglomeration method or their combinations.

Advantageously, the composite product 40, 40a, 40b is in the form of granulates. In one embodiment, the granulation is carried out by means of a method selected from the group consisting of water ring, underwater pelleting, air cooled, hot face strand, and their combinations. In one embodiment the granulation is made under water. In one embodiment the granulation is carried out by means of counterpressure, e.g. with underwater method.

In one embodiment, the granulates are formed directly from the mixture 15 comprising the organic natural fiber material and the matrix material by extrusion or by any other suitable process. In one embodiment, the granulates are formed from an intermediate composite product 40a, which intermediate composite product is formed from the mixture 15 by extrusion or by any other suitable process.

The main task of granulating, or pelleting, is to produce homogeneous free-flowing granulates, typically for further processing. In several processes, e.g. extrusion and injection moulding, easily dosable granulates are required for good production. Pre-granulation is often more important when organic natural fibers are used. Natural fiber plastic granulates can be manufactured with different methods.

Production of granulates may have two important targets: compounding and forming of granulates. These can be made with one machine or with different machines. The simplest way to produce natural fiber-polymer granulates is to use one machine or one machine combination which compounds material components and forms this material to granulates. One example of this kind of machine is a compounding twin screw extruder with granulation tool.

The apparatus 39 for forming the composite product may also be used for the primary mixing stage 36. The apparatus 39 for forming the composite product is preferably an extruder.

In the case of composite particles, the material components may be fed into a compounding extruder at the beginning of the screws so melting can start as soon as possible. Material components could be, for example, the matrix material, e.g. plastic, the natural organic fiber material, additives and fillers.

In some cases, the organic natural fiber material or a part of it can be fed later to avoid fiber break-ups. Adding fibers later, for example, into extruder, can also affect dispersion of fibers and plastic. Polymer is often melted mainly with friction, but some external heat can be used. Polymer, additives and fibers are preferably mixed when they are moving through a screw barrel. Melt compound may be pressed through a granulation tool, which is, for example, underwater pelletizer, and granulate is formed.

The composite product 40 and compounding of the materials are preferably formed with an extruder. Extruders can be divided into single, twin or multiple screw machines. The single screw can be with a smooth, grooved or pin barrel machine. The twin screw extruder can be a conical co-rotating twin screw extruder, a conical counter-rotating twin screw extruder, a parallel co-rotating twin screw extruder, or a parallel counter-rotating twin screw extruder. The multiple screw extruders can be with a rotating or static center shaft.

In addition or alternatively, the composite product 40 and compounding of the materials can be formed with mixers like internal mixer, heating-cooling mixer or z-blade mixer, or with any mixing device where polymer is melted with friction or internal and/or external heat and fibers are incorporated to polymer and other components. The mixing can be a batch or continuous process. The mixing can take place in low or high rotation speed, where low is preferably at least 10 rpm and e.g. not more than 2000 rpm. The composite product 40 and compounding of the materials can be formed with any of these or combination of these and some other process steps. Any of the mixers or extruders might contain some pre or post processing directly included in the extruder or mixer or by connecting shortly before or after the extruder. Advantageously, shredding, drying, and/or mixing are done in continuous process directly connected to extruder.

Forming of granulates, pellets or a similar composite product is usually made with granulation tool which is attached to an extruder or a melt pump. The granulating tool can be either a cold face cutter or a hot face cutter. One example of a suitable cold face cutter granulating tool is a strand pelletizer. In a hot face cutter, granulates are cut in melt form at the die plate. Suitable hot face cutter pelleting units can be divided, for example, into three categories: cutting and cooling in the air, cutting and cooling in water or cutting in the air and cooling in water.

Advantageously, the primary mixing stage is implemented with an extruder. In this case, after the primary mixing stage, the extruder is preferably also used to form the composite product, for example pellets or granulates.

Advantageously, the mixture 15 containing the organic natural fiber material 11, 11a and the matrix material 12 is extruded. In one embodiment, the mixture 15 is extruded after at least one pre-treatment. In one embodiment, the organic natural fiber material is supplied into the extrusion directly after the crushing. In one embodiment, the matrix material is mixed with the organic natural fiber material in connection with the extrusion without any pre-treatment stage.

In the case of the extrusion, any suitable single-screw extruder or twin-screw extruder, such as a counter-rotating twin-screw extruder or a co-rotating twin-screw extruder, may be used. The twin-screw extruder can have parallel or conical screw configuration. In one embodiment, different pelleting tools can be used in connection with the extruder. In one embodiment, the extrusion stage comprises a granulation step. In one embodiment, the granulation step is arranged after the extrusion. In one embodiment, the granulation step is a separate stage after the extrusion stage.

In an example, the melt of the mixture 15 comprising the organic natural fiber material and the matrix material is conveyed to a co-rotating parallel twin screw extruder, through melt pump to die plate to form strand of the mixture. This is preferably granulated after cooling of strand. In one example, a co-rotating conical twin-screw extruder is used for the composite production. The screw volume can be, for example, from 4 to 8 times bigger at the beginning of the screw than in the end of the extruder.

In an advantageous example, an extruder is used to form the composite product, for example, granulates. During the extrusion, the mixture 15 comprising organic natural fiber material and the matrix material is extruded in the extrusion step and preferably granulated in the granulation step. In the granulation, counterpressure is preferably used.

One example of the extrusion is compounding with a co-rotating twin screw extruder with strand pelletizing. In this case, material components are fed into main feed of the compounding extruder at the beginning of the screws so melting can start as soon as possible.

One example of the extrusion is compounding with a conical counter-rotating twin screw extruder with underwater pelletizing tool. In this case, material components are fed into main feed of the compounding extruder at the beginning of the screws so melting can start as soon as possible.

One example of the extrusion is compounded with a single screw extruder with screening unit and water ring pelletizing tool. In this case, material components are fed into main feed of the extruder at the beginning of the screws so melting can start as soon as possible.

The maximum conveying capacity of the extruder can be estimated according to equation:

$$\dot{V}_{slip} = nTA_{free} \qquad \text{Eq. (5)}$$

where n is rotation speed (1/s), T is pitch, and $A_{free}$ is free cross section area of the extruder.

Plastic melts adhere to the wall of barrel and thus the real conveying volume is less than in an ideal situation. The conveyed volume of such material for pressure-free conveying in multi-flighted profiles can be estimated according to equation:

$$\dot{V}_{est} = 0.5nTA_{free} \qquad \text{Eq. (6)}$$

The available volume or cross section area inside the screw of the parallel co-rotation twin screw extruder can be calculated based on information of machine supplier or literature. For double flighted screw design the free cross section area of such extruder can be calculated according to equation:

$$A_{free} = D_a^2 x_2 \qquad \text{Eq. (7)}$$

where $D_a$ is outer diameter of screw, $x_2$ is coefficient of double flighted screw according to cross-section area diagram of R. Erdmenger.

If we estimate that the bulk density of fiber conveyed to the extruder is the same as the apparent bulk density, we can calculate the volumetric flow of fiber to the machine according to equation:

$$\dot{V}_{fibre} = \frac{\dot{m}_{fibre}}{\rho_{apparent}} \qquad \text{Eq. (8)}$$

where $m_{fiber}$ is mass flow of fiber and $\rho_{apparent}$ is apparent bulk density of fibrous material.

When fiber is fed with maximum capacity to extruder, we can assume that the conveyed volume is similar to $V_{slip}$ (eq. 5).

The invention may provide composite products with good mechanical properties. Advantageously, the composite product is a natural fiber-polymer composite product. In one embodiment, a composite product comprises wood based material and matrix material.

Theoretical/calculatory density ($\rho_t$) of a composite material may be calculated from the masses and the densities of each individual component according to equation:

$$\rho_t = (m_1 + m_2 + \ldots + m_n) / \left(\frac{m_1}{\rho_1} + \frac{m_2}{\rho_2} + \ldots + \frac{m_n}{\rho_n}\right) \qquad \text{Eq. (9)}$$

where $m_1$, $m_2$, and $m_n$ are the masses of each individual component of the composite material, e.g. the composite product or the mixture containing fiber material and matrix material, and $\rho_1$, $\rho 2$, $\rho_n$ are the densities of each individual component of the composite material, e.g. the composite product or the mixture containing fiber material and matrix material.

Advantageously, the theoretical density of the mixture comprising or consisting of fiber material and matrix material is between 930-1600 kg/m³, preferably between 1000-1500 kg/m³. The theoretical density varies depending on components of the mixture and their densities.

Advantageously, the density of the composite product is between 0.90 and 1.6 g/cm³, or between 0.93 and 1.5 g/cm³, more preferably between 0.95 and 1.30 g/cm³, or between 0.97 and 1.20 g/cm³, and most preferably between 1.00 and 1.15 g/cm³.

Preferably, the density of the mixture is at least 85%, preferably over 90%, more preferable 95% and most preferable over 98% of the theoretical density. In an embodiment, the density of the mixture is at most 99.9% of the theoretical density of the theoretical density.

Preferably, the density of the composite product is at least 85%, preferably over 90%, more preferable 95% and most preferable over 98% of the theoretical density. In an embodiment, the density of the composite product is at most 99.9% of the theoretical density of the theoretical density.

Advantageously, the density of the composite product in a granulate form is between 0.90 and 1.30 g/cm³, more preferably between 0.95 and 1.20 g/cm³, and most preferably between 0.97 and 1.15 g/cm³.

Advantageously, the density of the composite product in a granulate form is between 0.90 and 1.10 g/cm³, more preferably between 0.95 and 1.10 g/cm³, and most preferably between 0.97 and 1.08 g/cm³ if the amount of the organic natural fiber material in the granulate is less than 40 wt. %.

Advantageously, the density of the composite product in a granulate form is between 0.95 and 1.20 g/cm³, more preferably between 0.97 and 1.15 g/cm³, and most preferably between 1.00 and 1.10 g/cm³ if the amount of the organic natural fiber material in the granulate is between 40 and 50 wt. %.

Advantageously, the density of the composite product in a granulate form is between 0.95 and 1.30 g/cm³, more preferably between 1.00 and 1.20 g/cm³, and most preferably between 1.03 and 1.15 g/cm³ if the amount of the organic natural fiber material in the granulate is at least 50 wt. %.

Formation of porosity into the composite product reduces the density of said product. Ideally, there is no unwanted porosity in the composite product. In practice, some porosity may exist no matter how good the process is in regard to minimizing the formation of porosity. Therefore, density can be used as one quantity for characterization of organic natural fiber—thermoplastic polymer composite product. A composite product can be characterized by its theoretical/calculatory density and its experimental density.

The term "pore volume" refers to a sum of partial volumes formed of gas volumes inside the object compared with the total volume of the object. In one embodiment, the pore volume of the mixture and/or the composite product is under 10%, preferably under 5%, more preferable under 2% and most preferable under 1%.

Organic natural fiber material has the character that it absorbs water. The amount of water absorption depends on the condition around the material. Cellulose fibers absorb water quite rapidly, but when fibers are covered by hydrophobic matrix material, the absorption is much slower. Absorption rate depends on the character of the matrix material, organic natural material content, but other things like additives can increase or decrease the absorption rate.

Advantageously, a dry composite product 40, 40a, 40b absorbs moisture under 1.5%, under 1.0%, or under 0.85%, more preferably under 0.7%, under 0.6% or under 0.5%, and most preferably under 0.4%, under 0.3%, under 0.2% or under 0.15% from the weight of the composite product in the time of 48 hours (65% RH and 27° C. atmosphere).

The composite product 40, 40a, 40b may be in the form of granulates. In this case, preferably the sizes of the granulates are in the same range. The weight of one granulate is preferably 0.01-0.10 g, and in one embodiment more, and in one embodiment less. Preferably, the weight of one granulate is 0.015-0.05 g. The weights of hundred granulates is preferably between 1 and 10 g. Preferably, the weight of 100 granulates is between 1.5 and 5 g. More preferable the weight of 100 granulates is between 2.0 and 4.0 g. Standard deviation is preferably under 15%, more preferably under 7%, and most preferable under 2%.

In one embodiment, the organic natural fiber material (the amount being between 5 and 95 wt. %, preferably between 10 and 60 wt. % or between 15 and 40 wt. %) is mixed with polymer (the amount being between 5 and 95 wt. %, preferably between 30 and 90 wt. % or between 40 and 80 wt. %) and additives (the amount being between 0 and 50 wt. %, preferably between 0 and 30 wt. % or between 5 and 20 wt. %) before adding the mixture, for example, into the extruder.

The present invention provides an industrially applicable, simple and affordable way of making intermediate composite products 40a and final composite products 40b from the organic natural fiber material and matrix material. The method according to the present invention is easy and simple to realize as a production process.

The method according to the present invention is suitable for use in the manufacture of different products from different organic natural fiber materials.

Feeding of the main components, i.e. the matrix material and the organic natural fiber material, may be more difficult, if the size of machines used for the process is too small, even if the calculated bulk density is low. In addition, very large sized machines may cause poorer mixing effect or other disadvantage(s). Therefore, if an extruder is used, advantageously the diameter of the extruder screw in the feeding area is at least 30 mm, at least 40 mm, or at least 50 mm, more preferably at least 60 mm or at least 70 mm, and the most preferably at least 90 mm or at least 110 mm. In addition or alternatively, the diameter of the extruder screw in the feeding area is preferably not more than 550 mm or not more than 500 mm, more preferably not more than 450 mm or not more than 400 mm, and most preferably not more than 350 mm or not more than 300 mm. If a batch process is used instead of the extruder or another continuous process, the free volume used is preferably at least 200 liters, at least 400 liters or at least 500 liters, more preferably at least 600 liters or at least 800 liters, and most preferably at least 1000 liters or at least 1500 liters.

Advantageously the production capacity of the apparatus used for the manufacturing process is at least 300 kg/h or at least 400 kg/h, more preferably at least 500 kg/h or at least 700 kg/h, and most preferably at least 1000 kg/h or at least 1500 kg/h.

Thanks to the method according to the present invention, it is possible to provide, among other things, homogeneous free-flowing granulates. An additional technical effect is to produce granulates for further processing. It is often important that good compounding is achieved between the organic natural fiber material and matrix material.

In one embodiment, the composite product is an intermediate product, such as pellets or granulates, which is preferably used in manufacturing of a final product. In another embodiment, the composite product of the present invention is a final product. The final product may be manufactured from the intermediate composite product, e.g. granulates, by any suitable method, for example by injection moulding, film casting, blow moulding, rotomoulding, thermoforming, compression moulding, re-extrusion, profile extrusion, sheet extrusion, film extrusion, and/or fiber extrusion, or the like. In one embodiment, the granulates of the composite product are used in the forming of the final product. In one embodiment, the granulates are finish-treated. Finish-treatment for granulates comprises, for example, drying, dust removing, classification and/or packing.

The composite product that is the final product, is preferably formed by the method selected from the group consisting of injection moulding, extrusion, and their combinations. In one embodiment, the final product is formed by injection moulding. In one preferred embodiment of the invention, the composite product is formed by extrusion. In one embodiment, the composite product is formed by a combination of extrusion and injection moulding.

The composite product comprises a mixture containing the organic natural fiber material and the matrix material. Preferably, the amount of the mixture in the composite product is at least 20 wt. % or at least 35 wt. %, more preferably at least 45 wt. % or at least 60 wt. % and most preferably at least 70 wt. % or at least 80 wt. % calculated of the total weight of the composite product. Preferably, the composite product consists of said mixture. Preferably, amounts of organic natural fiber material and matrix material are adjusted in the mixing.

Advantageously, the composite product according to the present invention comprises between 10 and 80 wt. % or between 12 and 70 wt. % more preferably between 14 and 60 wt. % or between 16 and 50 wt. %, and most preferably between 18 and 40 wt. % or between 20 and 30 wt. % organic natural fiber material.

Advantageously, at least 50 wt. % or at least 70 wt. %, more preferably at least 80 wt. % or at least 90 wt. % and most preferably at least 95 wt. % of the natural organic fiber material in the composite product comes from the mixture 15.

Advantageously, the composite product according to the present invention comprises matrix material between 5 and 95 wt. %, more preferably between 20 and 90 wt. % or between 30 and 85 wt. % and most preferably between 40 and 80 wt. %.

Advantageously, the composite product according to the present invention comprises additives and/or fillers, the total amount of said additives and fillers being between 0 and 50 wt. %, more preferably between 0.5 and 40 wt. % and most preferably between 1 and 30 wt. %.

In one embodiment of the invention, the composite product has light color without coloring agents. Preferably, pigments and coloring agents are not needed to be used in the composite product of the invention. The light color means that the natural fibers are not degraded remarkably.

Advantageously, the composite product has good dispersion. Dispersion is the term that describes how well other components are mixed with the matrix material, preferably with the polymer matrix. Good dispersion means that all other components are evenly distributed into material and all solid components are separated from each other i.e. all particles or fibers are surrounded by matrix material.

Advantageously, the composite product 40 forms or is a part of
- a decking,
- a floor,
- a wall panel,
- a railing,
- a bench, for example a park bench,
- a dustbin,
- a flower box,
- a fence,
- a landscaping timber,
- a cladding,
- a siding,
- a window frame,
- a door frame,
- indoor furniture,
- a construction,
- an acoustic element,
- a package,
- a part of an electronic device,
- an outdoor structure,
- a part of a vehicle, such as an automobile,
- a road stick for snow clearance,
- a tool,
- a toy,
- a kitchen utensil,
- cookwear,
- white goods,
- outdoor furniture,
- a traffic sign,
- sport equipment,
- containers, pots, and/or dishes, and/or
- a lamp post.

The method of the present invention offers a possibility to prepare the products from organic natural starting material cost-effectively and energy-effectively.

EXAMPLES

The invention is described in more detail by the following examples.

Example 1

In this example, which is shown in FIG. 1, a composite product 40 is formed from organic natural fiber material 11, 11a and polymer based matrix material 12. The organic natural fiber material is birch pulp based material. Polymer based matrix material is polyethylene.

The organic natural fiber material is crushed 23 by a grinding method selected from the group consisting of crushing-based grinding, attrition-based grinding, abrasion-based grinding, cutting-based grinding, blasting-based grinding, explosion-based grinding, wet grinding, dry grinding, grinding under pressure and their combinations in order to form organic natural fiber material. In one embodiment the fiber material is crushed 23 by crushing-based grinding. In one embodiment the fiber material is crushed by cutting grinding. Preferably, the fiber material is crushed so that fibers are separated and cut from the organic natural fiber material. In one embodiment the grinding device used for grinding the fiber material is selected from the group consisting of impact mill, air jet mill, sand mill, bead mill, pearl mill, ball mill, vibration mill, screw mill and their combinations. The grinding can be performed in one or more grinding steps by one or more grinding methods. In one embodiment the fiber material is formed by grinding the fiber material in one or more steps. Preferably the organic natural fiber material 11, 11a is crushed 23 by cutting grinding. The fibers of the organic natural fiber material are separated in a separation stage 24 before the contacting step of the primary mixing stage 36 to form bulky organic natural fiber material composition 40. A compression ratio of the organic natural fiber material composition 40 in the contacting step of the mixing is 8 at the most.

The fibers of organic natural fiber material 11, 11a are mixed with polymer-based matrix material 12 in the primary mixing stage 36 without compression to form a mixture 15. The polymer-based material 12 is arranged in the form of melt at least in the contacting step 36a of the primary mixing stage in which the organic natural fiber material comes in contact with the melt polymer-based material. The organic natural fiber material is mixed lightly and in the presence of air with the polymer-based material in the mixing step in order to form the mixture so that the mixing is made without a compression and the organic natural fiber material is evenly distributed to a mixing volume and the organic natural fiber material become wet by the polymer-based material.

The intermediate composite product 40a is formed from the mixture by extrusion. The intermediate 40a composite product is in the form of granulates.

A final composite product 40b is formed from the intermediate composite product granulates, e.g. by an additional extrusion step.

Example 2

In this example, which is shown in FIG. 2, a composite product is formed from organic natural fiber material 11, 11a and polymer based matrix material 12. The organic natural fiber material is pine pulp based material. Polymer based matrix material is polyethylene.

The organic natural fiber material is crushed 23 to form bulky organic natural fiber material 11a and after the crushing 23 the organic natural fiber material is fed into a heat mixing, i.e. into a mixing where temperature is increased, in which polymer-based matrix material is added into the fiber material. The mixture 15 containing the organic natural fiber material and polymer-based matrix material are fed in the extrusion stage in which the composite product 40 is formed.

Example 3

In this example, which is shown in FIG. 3, a composite product 40 is formed from a mixture 15 containing organic natural fiber material 11, 11a and polymer based matrix material 12 by an extrusion stage.

During the extrusion stage the mixture 15 is first extruded in an extrusion step 39a and then granulated in a granulation step 39b. In the granulation step counterpressure is used.

Example 4a

One example of extrusion is compounding with a parallel co-rotating twin screw extruder with strand pelletizing. Material components are fed into a main feed of compounding extruder at the beginning of the screws so melting can start as soon as possible.

Example 4b

One example of extrusion is compounding with a parallel co-rotating twin screw extruder with an underwater pelletizing tool. Polymer-based matrix material and additives are fed into a main feed of compounding extruder at the beginning of the screws so melting can start as soon as possible. The organic natural fiber material is fed to melt polymer from side feed of compounding extruder.

Example 5

One example of extrusion is compounding with a conical counter-rotating twin screw extruder with an underwater pelletizing tool. Material components are fed into a main feed of compounding extruder at the beginning of the screws so melting can start as soon as possible.

Example 6

One example of extrusion is compounding with a single screw extruder with a screening unit and a water ring pelletizing tool. Material components are fed into a main feed of extruder at the beginning of the screws so melting can start as soon as possible.

Example 7

The maximum conveying capacity of an extruder can be estimated according to equation:

$$V_{slip}^{\cdot} = nTA_{free} \quad \text{Eq. (5)}$$

where n is rotation speed (1/s), T is pitch and $A_{free}$ is free cross section area of extruder.

Plastic melts adhere to the wall of a barrel and thus the real conveying volume is less than in an ideal situation. The conveyed volume of such material for pressure-free conveying in multi-flighted profiles can be estimated according to equation:

$$V_{est}^{\cdot} = 0.5nTA_{free} \quad \text{Eq. (6)}$$

The available volume or cross section area inside the screw of the parallel co-rotation twin screw extruder can be calculated based on information from machine supplier or literature. For a double flighted screw design the free cross section area of such extruder can be calculated according to equation:

$$A_{free} = D_a^2 x_2 \quad \text{Eq. (7)}$$

where $D_a$ is outer diameter of screw, $x_2$ is coefficient of double flighted screw according to cross-section area diagram of R. Erdmenger.

In the example this $x_2$ is 0.55, when D/d ration is 1.55 and outer diameter of screws is 50 mm. For this machine the free cross section area would be 0.138 dm$^2$ and available volume on the length of feeding zone 82 mm would be 0.11 liters.

Fiber material is fed 60 kg/h to the extruder and polypropylene melt 140 kg/h while having extruder rotation speed of 350 rpm. This would mean 0.57 kg/(h rpm) of throughput, and 0.17 kg/(h rpm) or 17 g/s or 2.9 g of fiber feed per revolution of extruder screw. If we estimate that the bulk density of fiber conveyed to the extruder is the same as the apparent bulk density we can calculate the volumetric flow of fiber to the machine according to equation:

$$\dot{V}_{fibre} = \frac{\dot{m}_{fibre}}{\rho_{apparent}} \quad \text{Eq. (8)}$$

where $m_{fiber}$ is mass flow of fiber and $\rho_{apparent}$ is apparent bulk density of fibrous material. When we have an apparent bulk density of 68 g/l (dry weight), we have 0.245 l/s fiber volumetric flow to extruder.

When fiber is fed with maximum capacity to the extruder, we can assume that the conveyed volume is similar to $V_{slip}$ (eq. 5) and thus, according to equation 5, with pitch (T) of 60 mm, we calculate volumetric flow of 0.481 l/s, where we need to subtract the volume of polymer melt (0.103 l/s). When using polypropylene the melt density at 200 C is 0.74 kg/dm$^3$ and if the air volume of melt is similar to polymer melt, we can calculate "available volume" in the screw for the fiber.

Based on these we can get "the minimum calculated bulk density" at the moment when fiber is incorporated to polymer melt: 17 g/s/0.379 liter/s=44 g/liter. When we know that the apparent bulk density is 68 g/l, we have a compression coefficient of 0.65. By having this compression coefficient on that level until the fiber is wet, the fiber is well dispersed into the plastic with good mechanical properties and with some degradation of polymer.

Example 8

The maximum conveying capacity of an extruder can be estimated according to equation 5. The available volume or cross section area inside the screw of the parallel co-rotation twin screw extruder can be calculated based on information from machine supplier or literature. For double flighted screw design the free cross section area of such extruder can be calculated according to equation 7.

In this example $x_2$ is 0.55, when D/d ration is 1.55 and outer diameter of screws is 50 mm. For this machine the free cross section area would be 0.138 dm$^2$.

Fiber material is fed 60 kg/h to the extruder and polypropylene melt 140 kg/h while having extruder rotation speed of 250 rpm. This would mean 0.8 kg/(h rpm) of throughput, and 0.24 kg/(h rpm) or 17 g/s or 4 g of fiber feed per revolution of extruder screw. If we estimate that the bulk density of fiber conveyed to the extruder is the same as the apparent bulk density we can calculate the volumetric flow of fiber to the machine according to equation 8. When we have bulk density of 68 g/l (dry weight) we have 0.245 l/s fiber volumetric flow to the extruder.

When fiber is fed with maximum capacity to the extruder, we can assume that the conveyed volume is similar to $V_{slip}$ (eq. 5) and thus, according to equation 5, with pitch (T) of 60 mm, we calculate volumetric flow of 0.344 l/s, where we need to subtract the volume of aerated polymer melt (0.103 l/s). When using polypropylene the melt density at 200° C. is 0.74 kg/dm$^3$ and if the air volume of melt is similar to polymer melt, we can calculate "available volume" in the screw for the fiber.

Based on these we can get "calculated bulk density" at the moment when fiber is incorporated to polymer melt: 17 g/s/0.241 liter/s=84 g/liter. When we know that the apparent bulk density is 68 g/l, we have a compression coefficient of 1.02. By having this compression ratio on that level until the fiber is wet, the fiber is well dispersed into the plastic with good mechanical properties and only slightly degradation of polymer.

Example 9

This example relates to a Z-blade mixer.

A composite material is prepared with a double-z-kneader. The kneader is a batch mixer with a volume of approximately 3 dm³. It has two counter-rotating Z-blades, the mixing speed is constant and temperature is controlled. Due to the low rotation speed of the mixing blades, low shear forces and low heat generation by friction is expected. The composite material was prepared as follows:
1. The kneader was heated to 190° C.,
2. 300 g of HDPE polymer was melted in the mixer for 10 min,
3. 17 g of coupling agents were added to the polymer melt to form matrix material and mixed for 5 min,
4. 210 g of oven dry organic natural fiber material, which is in the form of birch cellulose flakes, where 80% of flakes have a thickness between 1 micron and 20 micrometers and the apparent bulk density of the material is 100 g/dm³, was added to the polymer melt,
5. Mixing was continued until the compound appeared well mixed and homogenous with good dispersion of the organic natural fiber material in the matrix material and minimal thermal degradation of the components, and
6. the mixer was emptied and the prepared composite material was cooled in air.

In this specific example the calculated bulk density of organic natural fiber material is approximately 90 g/dm³, when the volume of the mixing elements, matrix material and additives are taken into account in the available free volume of the mixer. In this specific example the compression ratio R is approximately 0.9.

Example 10

This example relates to a Z-blade mixer.

A composite material is prepared with a double-z-kneader. The kneader is a batch mixer with a volume of approximately 3 dm³. It has two counter-rotating Z-blades, the mixing speed is constant and temperature is controlled. Due to the low rotation speed of the mixing blades, low shear forces and low heat generation by friction is expected. The composite material was prepared as follows:
1. the kneader was heated to 190° C.,
2. 180 g of polypropylene was melted in the mixer for 10 min,
3. 11 g of coupling agents were added to the polymer melt to form matrix material and mixed for 5 min,
4. 169 g of organic natural fiber material, in the form of crushed eucalyptus cellulose having moisture content of 7% and apparent bulk density of 40 g/dm³ (dry weight) was added to the polymer melt,
5. mixing was continued until the compound appeared well mixed and homogenous with good dispersion of the organic natural fiber material in the matrix material and minimal thermal degradation of the components, and
6. the mixer was emptied and the prepared composite material was cooled in air.

In this specific example the calculated bulk density of organic natural fiber material is approximately 70 g/dm³, when the volume of the mixing elements, matrix material and additives are taken into account in the available free volume of the mixer. In this specific example the compression ratio R is approximately 1.7.

Example 11

This example relates to mixing without compression.

In this example organic natural fiber material and matrix material containing polymer and additives are mixed with a batch type internal mixer without compression. In this embodiment the volume of the mixer is 440 liters. 45 kg polypropylene, 3 kg additives and 12 kg organic natural fiber material is mixed with this mixer. Moisture content of the fiber material is 3%. All ingredients are first fed into the mixer and the mixer is started. Additional external heating is used, because friction is low and melting of the polymer takes too long.

Polypropylene is injection moulding grade polypropylene. Organic natural fiber material is pulp based fibers from crushed paper sheets. Additives are polypropylene based additives.

Density of the melted polypropylene is 0.74 kg/liter and volume of the polypropylene in the mixer is 60.81 liters. Volume of the melted additives in the mixer is 4.05 kg/liter. Bulk density of the dry organic natural fiber material is 0.05 kg/liter and volume of the dry organic natural fiber material in the mixer is 12 kg*0.97/0.05 kg/liter=232.8 liters. 3% moisture content vaporize during processing.

Free volume for the fiber material in the mixer 440−60.81−4.05=375.14 liters. Calculated density of the dry fibers in the mixer is 12 kg*0.97/375.14 liters=0.031 kg/liter. In this embodiment the compression ratio R is 0.031 kg/liter/ 0.05 kg/liter=0.62 so mixing is made without any compression to the fibers.

Example 12

This example relates to mixing with a heating/cooling mixer.

In this example composite material is prepared with a heating/cooling-mixer. In this embodiment the volume of the heating section of the mixer is 800 liters and the volume of the cooling section of the mixer is 1700 liters. Heat is generated by friction with mixing elements. 180 kg organic natural fiber material and matrix material containing 90 kg polypropylene and 30 kg additives are fed into the heating section of the mixer. Moisture content of the fibers is 5%. Moisture is vaporized during processing.

Polypropylene is injection moulding grade polypropylene. Additives are mineral fillers and polypropylene based stabilizers. Organic natural fiber material is mechanically pre-processed eucalyptus chemical pulp. 90% of the fiber material including possible agglomerates is under 2 mm length.

All raw materials are first fed into the heating section of the mixer and the mixer is started. Mixing continues until the temperature is 220° C. and polymer is totally melted. The fiber material and additives are now dispersed with polymer melt. Homogeneous composite material is cooled in the cooling section of the mixer until the temperature is 50° C. and material is totally solid. After cooling the mixer the material is fluffy and color is light brown.

Density of melted polypropylene is 0.74 kg/liter on volume which is 121.62 liters. Total volume of additives is 45 liters. Free volume for fibers is 800−121.62−45=633.38 liters. Bulk density of dry fibers is 0.25 kg/liter. Calculated density of the dry fibers in the mixer is 180 kg*0.95/633.38 liters=0.27 kg/liter. In this embodiment the compression ratio in the mixer is 0.27 kg/liter/0.25 kg/liter=1.08.

Example 13

In this example organic natural fiber material, polymer and additives are mixed in a batch process with a so-called internal mixer. In this embodiment the volume of the mixer is 5 liters. Organic natural fiber material is chemically and mechanically modified chemical pulp made of birch. The bulk density of fiber material is 109 g/l, at moisture content 6.5%.

2.35 kg polypropylene, 0.12 kg additives and 1.72 kg fiber material is added to mixer. Fibers of the fiber material are incorporated to the polymer when polymer is in melted form. Density of melted polypropylene and additives together is 0.76 kg/liter and volume of the polypropylene and additives in the mixer is 3.25 liters. Bulk density of the fiber material without moisture is 0.102 kg/liter.

Free volume for the fiber material in the mixer is 5 liter–3.25 liter=1.75 liter and thus, the calculated bulk density is 1.61 kg/1.75 liter=0.92 kg/liter, when the moisture content of the fiber material is taken into account. The compression ratio R is 0.92/0.102=9, so mixing is performed with high compression to the fibers. This makes the conditions unfavourable for good wetting of fibers, and thus, dispersion of fibers to matrix is poor.

Example 14

In this example organic natural fiber material, polymer and additives are mixed with a continuous process. In this embodiment the rotation speed of mixing elements is adjusted so that the volumetric flow of the mixture is 0.95 liters/s. The melt of the mixture is conveyed to a co-rotating parallel twin screw extruder, through a melt pump to a die plate to form a strand of the mixture. This is granulated after cooling of the strand.

Organic natural fiber material is chemically and mechanically modified chemical pulp made of conifer having a bulk density of fiber material 125 g/l at moisture content 1.5%. The organic natural fiber material in this example has a flake form meaning that the thickness of flakes varies from 2 microns to 15 microns and the width is at least 2 times larger than the thickness.

250 kg/h polypropylene and additives is fed to the mixer as well as 200 kg/h organic natural fiber material and 50 kg/h talc. Fibers of the organic natural fiber material and talc are incorporated to the polymer when polymer is in melted form. Density of melted polypropylene and additives together is 0.76 kg/liter and density of talc 2.75 kg/liter. Thus, the volumetric flow of the polypropylene, additives and talc in the mixer is 0.097 liter/s. Bulk density of the organic natural fiber material without moisture is 0.123 kg/liter.

Free volume for the organic natural fiber material in the mixer is 0.95 liter/s–0.097 liter/s=0.853 liter/s and thus, the calculated bulk density is 55.6 g/s/0.853 liter/s=65 g/liter, when moisture content of the fiber material is taken into account. The compression ratio R is 65 g/liter/123 g/liter=0.53. This makes the conditions potential for good wetting of fibers.

Example 15

In one example a co-rotating conical twin-screw extruder was used for the composite production. This extruder has a huge feed volume, but the screw volume can be ca. ⅛ of that volume in the end of the screw. When the fiber materials go through the screw, they are compressed and the pressure increase at same time. This can cause the bulk density to be quite high, when the organic natural fiber material touches the matrix material in the melt form.

Polypropylene and pine cellulose based organic natural fiber material are used in this example. The organic natural fiber material in this example has a flake form meaning that the thickness of flakes varies from 2 microns to 15 microns and the width is at least 2 times larger than the thickness. The alfa-cellulose content of the material is below 90%. The bulk density of the dry organic natural fiber material is 120 g/liter. The free volume in the beginning of the screw is 1.6 liters. The through put was 500 kg/h and the natural fiber content was 50%. The feed volume of matrix material in the melt form was 0.094 liter/s, when melt density was 0.74 kg/l. The organic natural fiber material was fed at the same time (0.58 liter/s). The extruder can easily take this organic natural fiber material amount and calculated bulk density is below the apparent bulk density of the organic natural fiber material. The extruder rotation speed was adjusted so that conveying capacity in the beginning of the mixing part of the screw was 0.844 l/s. In this embodiment polymer starts to melt in the beginning of the 1st mixing section. The calculated bulk density can be defined when mass flow of organic natural fiber material in the beginning of the mixing part of the screw was 69.4 g/s and available, free conveying capacity for that material was 0.75 l/s. Thus, the calculated bulk density in that point was 93 g/l and the compression ratio R was 0.77. In the beginning of the screw the conveying capacity was ca. 5 times higher.

Example 16

In one example a co-rotating conical twin-screw extruder was used for the composite production. This extruder has a huge feed volume, but the screw volume can be ca. ⅛ of that volume in the end of the screw. When the fiber materials go through the screw, they are compressed and the pressure increases at same time. This can cause the bulk density to be quite high, when the organic natural fiber material touches the matrix material in the melt form.

Polypropylene and birch cellulose based organic natural fiber material are used this example. The organic natural fiber material in this example has a flake form meaning that the thickness of flakes varies from 2 microns to 15 microns and the width is at least 2 times larger than the thickness. The alfa-cellulose content of the material is above 70%. The bulk density of the dry organic natural fiber material is 60 g/liter. The free volume in the beginning of the screw is 1.6 liters. The trough put was 500 kg/h and the natural fiber content was 40%. The feed volume of matrix material in the melt form was 0.113 liter/s and the organic natural fiber material was fed at the same time (0.93 liter/s). The extruder can take this organic natural fiber material amount and calculated bulk density is below the apparent bulk density of the organic natural fiber material. The extruder rotation speed was adjusted so that conveying capacity in the beginning of the mixing part of the screw was 0.844 l/s. In this embodiment polymer starts to melt in the beginning of the 1st mixing section. The calculated bulk density can be defined when mass flow of organic natural fiber material in the beginning of the mixing part of the screw was 55.6 g/s and available, free conveying capacity for that material was 0.73 l/s. Thus, the calculated bulk density in that point was 76 g/l and compression ratio R was 1.27. In the beginning of the screw the conveying capacity was ca. 5 times higher.

Example 17

Measurements Relating to the Organic Fiber Material

When the organic natural fiber material content of a composite material is unknown, several analysis methods can be used for determination of the organic natural fiber material content of the composite material. Analysis methods suitable for determination of the organic natural fiber material content of an unknown composite material include, but are not limited to physical, chemical, thermal, optical and microscopy analysis techniques. The organic natural fiber material content of an unknown composite material can be analyzed, for example, with thermogravimetric, calorimetric, spectroscopic, crystallographic, tomographic, and microscopic analysis, and by selectively dissolving the different components comprising the unknown composite material in order to resolve the mass fraction of the organic natural fiber material comprising the unknown composite material. The organic natural fiber material content of an unknown composite, provided that the matrix material is non-bio-based material and that the other components comprising the unknown composite are known or can be resolved, can also be determined by quantifying the bio-based content of the composite according to standard ASTM-D6866 or with similar analysis methods that can differentiate between bio-based and non-bio-based chemical elements including, but not limited to, methods based on carbon dating, and calculating the organic natural fiber material content according to the molar fraction of the chemical element of interest in the organic natural fiber material. In addition, the organic natural fiber content of an unknown composite can be determined, for example, by x-ray diffraction and x-ray computed tomography techniques. The organic natural fiber material content of an unknown composite can be determined by different combinations of analysis methods including, but not limited to, methods described above.

In an example, a sample of a composite material comprising organic natural fiber material and non-bio-based polymers, such as petroleum based polyolefins, is analyzed for bio-based content according to ASTM-D6866 and the organic natural fiber material content of the composite material is calculated according to the molar fraction of carbon in the organic natural fiber material.

In another example, a sample of a composite material comprising organic natural fiber material is analyzed with x-ray computed tomography and the content of the organic natural fiber material within the sample is determined.

Example 18

Organic Natural Fiber Material

Due to the hygroscopic character of organic natural fibers, the fibers typically contain moisture. The moisture content of the fibers depends, for example, on the origin of the fibers, on the storing conditions of the fibers, e.g. relative humidity and temperature of the surroundings where the fibers are stored, and on the processing of the fibers. Typically, the presence of moisture cannot be fully excluded while processing organic natural fibers, and in some cases excess moisture can be harmful.

In the case of organic natural fiber and thermoplastic or other polymer composites, the presence of moisture in processing can cause, for example, deterioration of product properties such as mechanical strength and visual appearance. Processing temperatures of organic natural fiber-thermoplastic/polymer composites are typically above the boiling point of water due to the higher than 100° C. melting and/or glass transition temperatures of thermoplastic/polymers.

In processing of organic natural fiber-thermoplastic/polymer composites at temperatures above boiling point of water, the vaporization of moisture contained in the fibers can cause formation of porosity into the product material. The porosity can appear, for example, in the form of gas bubbles or as voids between fiber surfaces and matrix polymer in the composite product.

Another reason for formation of porosity can be inclusion of air or other surrounding gases during processing due to insufficient gas removal in the process. Especially, feeding of reinforcement fibers brings a large volume of gases to be removed in the process. For example, in preparation of organic natural fiber—thermoplastic/polymer composites by compounding extrusion sufficient venting is necessary in order to remove gaseous substances including water vapor, entrained air and other gases, and other volatile components.

Example 19

Bulk Density and Compression Ratio

In an example, if 11.1 g of organic natural fiber material that has the bulk density 80 g/l and the moisture content 10 wt. %, the weight of dry material is 10.0 g and the bulk density is 72 g/l. The bulk density can be calculated as follows: the material is weighted into a pot (2 liter) and the organic fiber material is mixed with a mixer. In this case the fiber material can be evenly distributed over the whole volume and the calculated bulk density would be 10 g/2 l=5 g/l and the compression ratio R is 5/72=0.069. On the other hand, if some other materials than the organic fiber material are added to the same pot, the weight and volume of these materials will be subtracted. If there are 10 g of talc (density of talc 2.75 g/cm$^3$) and 11.1 g of organic material (the bulk density is 80 g/l and the moisture content is 10 wt. %), the weight of dry material is 10.0 g and the bulk density is 72 g/l. In this case the volume of talc is 10 g/2.75 g/cm$^3$=3.6 cm$^3$. The free volume for the fibers is reduced to 1.996 liters and the calculated bulk density would be 10 g/1.996 l=5.01 g/l, and the compression ratio R is 5.01/72=0.070.

Example 20

Bulk Density and Compression Ratio

In an example, the organic fiber material is mixed with an extruder so that material is fed and conveyed 10 g/s (dry) into mixing zone which transports materials forward 2 dm$^3$/s. In this case the fiber material can be evenly distributed over the whole volume and the calculated apparent bulk density would be 10 g/2 l=5 g/l. On the other hand, if some other materials than the organic fiber material are added to the same volume, which is available at given time, the weight and volume of these materials will be subtracted. For example, for 10 g of organic fiber material (dry) and 10 g of talc (density of talc 2.75 g/cm$^3$), the volume of talc is 10 g/2.75 g/cm$^3$=3.6 cm$^3$. The free volume for the fibers is reduced to 1.996 liters and the calculated bulk density would be 10 g/1.996 l=5.01 g/l.

Example 21

Bulk Density and Compression Ratio

In an example, in order to measure the bulk density value, the organic natural fiber material is first mixed with a mixer (e.g. Philips HR1570/30) for a suitable time, such as 5 minutes, in a large bowl. During the mixing all compressed fibers and crushed particles are separated. Then the weight and volume of this bulky fiber material sample is carefully measured. The bulk density ρ is calculated by dividing the weight of this bulky organic fiber material by its volume. Because organic natural fiber materials can absorb quite a high amount of moisture, in all cases the content of water will be subtracted from the bulk density results and the results will be given for the dry materials, e.g. the measured bulk density of organic natural fiber material is 100 g/l and moisture content is 5 wt. %. The bulk density of that material is 95 g/l. So the moisture content and the bulk density are measured separately and the bulk density (dry) is calculated from the values.

Example 22

Calculated Bulk Density in the Extruder

Calculated bulk density in the extruder can be quite high and the compression ratio over 1, if a high production capacity and high organic natural fiber content is looked for. In this case the free volume is volume inside the barrel, where the volume of the screw, matrix material volume and matrix material melt volume is reduced. When mixing takes place in a short length of the screw or the conveying volume of the screw is small compared to fiber material mass forced inside the extruder, the calculated bulk density can be quite high. If organic natural fiber is fed 26.7 g/s and free conveying volume for fibre is only 0.083 Ws, the calculated bulk density would be ca. 320 g/l and compression ratio 4.7 with material having apparent bulk density of 68 g/l.

It is possible to increase the volumetric conveying capacity by forcing the organic fiber material to move faster than the screw and thus, it is possible to decrease the calculated bulk density $\rho_{calculated}$. Or, the organic fiber material can be forced to counter flow so that the calculated free volume is increased by spreading the organic fiber material to a longer distance, further inside the barrel. This can be done by e.g. air. The compressed gas can be blown inside the barrel and this gas can carry fibers further from the addition point. Also vacuum in the other point of barrel can cause the pressure difference to transport the fibers. In both cases the length where the mixing takes place is longer and this reduces the calculated bulk density.

Example 23

Bulk Density

In this example, a sample of organic natural fiber material is collected from a process flow, that can be considered to be well mixed and aerated and where fiber agglomerates are disintegrated and for which additional mixing, for example, by blenders, food mixers, concrete-mixers, and fluidization techniques is not required for determination of the bulk density, into a container of known volume and weight and the bulk density of the organic natural fiber material is obtained as the mass of the sample per unit volume.

Example 24

In this example, a sample from a process flow at a production line of a composite mixture, wherein one component of the composite mixture is organic natural fiber material, is collected and the organic natural fiber material is separated by different separation and classification methods including, but not limited to, screening, cyclone separators, and vacuum separators. Bulk density of the separated organic natural fiber material can be determined as described above.

Example 25

In one embodiment the composite product includes the organic natural fiber material 40-60%, and dry composite product absorbs moisture under 1.5% from the weight of the composite product in the time of 30 hours (50% RH and 22° C. atmosphere). In one embodiment the composite product includes the organic natural fiber material 20-40%, and dry composite product absorbs moisture under 1.3% from the weight of the composite product in the time 30 hours (50% RH and 22° C. atmosphere). In one embodiment moisture uptake from the atmosphere can be measured from the dry composite products. Before the measurement the composite products have to be dried. Composite product should be dried at a temperature of 120° C. for 48 hours before the measurement. For the moisture uptake measurement at least 10 grams of products will be placed on the plate. There should be only one granulate layer on the plate. Moisture uptake will then be measured as a weight increase compared to the weight of dry products. So if the weight of dry composite product increases from 10.0 g to 10.1 g, the result will be 1.0%. In these measurements the conditions are: temperature 22° C. and moisture content of air 50% RH. Different measurement times can be used depending on the need.

Example 26

In one embodiment the composite product includes the organic natural fiber material 40%, and dry composite product absorbs moisture under 0.7% from the weight of the composite product in the time of 4 days (50% RH and 23° C. atmosphere). In one embodiment the composite product includes the organic natural fiber material 40%, and dry composite product absorbs moisture under 0.6% from the weight of the composite product in the time of 48 hours (50% RH and 23° C. atmosphere). In one embodiment the composite product includes the organic natural fiber material 40%, and dry composite product absorbs moisture under 0.15% from the weight of the composite product in one hour (50% RH and 23° C. atmosphere). In one embodiment moisture uptake from the atmosphere can be measured from the dry composite products. Before the measurement the composite products have to be dried. The composite product should be dried at a temperature of 120° C. for 48 hours before the measurement. For the moisture uptake measurement at least 30 grams of products will be placed in the 2 dl cup. Moisture uptake will then be measured as a weight increase compared to the weight of dry products. So if the weight of dry composite product increases from 10.0 g to 10.1 g, the result will be 1.0%. In these measurements the conditions are: temperature 23° C. and moisture content of air 50% RH. Different measurement times can be used depending on the need.

Example 27

In one embodiment the composite product includes the organic natural fiber material 40%, and dry composite product absorbs moisture under 0.85% from the weight of the composite product in the time of 4 days (65% RH and 27° C. atmosphere). In one embodiment the composite product includes the organic natural fiber material 40%, and dry composite product absorbs moisture under 0.7% from the weight of the composite product in the time of 48 hours (65% RH and 27° C. atmosphere). In one embodiment moisture uptake from the atmosphere can be measured from the dry composite products. Before the measurement the composite products have to be dried. Composite product should be dried at a temperature of 120° C. for 48 hours before the measurement. For the moisture uptake measurement at least 30 grams of products will be placed in the 2 dl cup. Moisture uptake will then be measured as a weight increase compared to the weight of dry products. So if the weight of dry composite product increases from 10.0 g to 10.1 g, the result will be 1.0%. In these measurements the conditions are: temperature 27° C. and moisture content of air 65% RH. Different measurement times can be used depending on the need.

One skilled in the art readily understands that the different embodiments of the invention may have applications in environments where optimization of the composite product is desired. It is also obvious that the present invention is not limited solely to the above-presented embodiments, but it can be modified within the scope of the appended claims.

The invention claimed is:

1. A method for manufacturing a composite product comprising organic natural fiber material and matrix material, wherein the organic natural fiber material is chemical pulp having a lignin content under 1 wt. %, the method comprising:
   crushing the organic natural fiber material to form bulky organic natural fiber material such that the fiber material is at least partly in the form of flakes after the crushing,
   mixing the organic natural fiber material with the matrix material in a primary mixing stage to form a mixture, the primary mixing stage comprising a contacting step in which
   the organic natural fiber material comes in contact with the matrix material that is at least partly in a form of melt, and
   bulk density of the organic natural fiber material is less than 160 kg/m$^3$, the method further comprising:
   forming a composite product comprising the mixture.

2. The method according to claim 1, wherein the pressure compressing the organic natural fiber material in the contacting step is less than 1 bar.

3. The method according claim 1, wherein the organic natural fiber material and the matrix material are mixed in a vacuum or in the presence of nitrogen, air and/or helium.

4. The method according to claim 1, wherein moisture content of the organic natural fiber material is below 7% in the contacting step of the mixing.

5. The method according to claim 1, wherein organic natural fiber material content is at least 20 dry wt. % and 80 dry wt. % at the most, calculated from the total dry weight of the composite product.

6. The method according to claim 1, wherein the amount of flake-form fiber material is at least 30 dry wt. % calculated from the total amount of the organic natural fiber material.

7. The method according to claim 1, wherein the melting point of the matrix material is under 250° C. and/or the glass transition temperature of the matrix material is under 250° C.

8. The method according to claim 1, wherein the composite product is formed by an injection moulding, and/or an extrusion.

9. The method according to claim 1, wherein the matrix material is thermoplastic.

10. The method according to claim 1, wherein at least 90 wt. % of the organic natural fiber material is wood material.

11. The method according to claim 1, wherein a length of at least 90 wt. % of the organic natural fiber material is between 0.1 mm and 3 mm.

* * * * *